(12) United States Patent
Zauderer

(10) Patent No.: US 8,277,543 B2
(45) Date of Patent: Oct. 2, 2012

(54) FOSSIL FUEL FIRED, CLOSED CYCLE MHD GENERATOR IN PARALLEL WITH STEAM TURBINE CYCLE WITH ZERO EMISSIONS AND $CO_2$ SEQUESTRATION

(76) Inventor: Bert Zauderer, Merion Station, PA (US)

( * ) Notice: Subject to any disclaimer, the term of this patent is extended or adjusted under 35 U.S.C. 154(b) by 0 days.

(21) Appl. No.: 13/302,417

(22) Filed: Nov. 22, 2011

(65) Prior Publication Data
US 2012/0137877 A1    Jun. 7, 2012

Related U.S. Application Data

(60) Provisional application No. 61/418,977, filed on Dec. 2, 2010.

(51) Int. Cl.
| | |
|---|---|
| *F28D 3/14* | (2006.01) |
| *B01D 53/34* | (2006.01) |
| *B01D 53/62* | (2006.01) |
| *B01D 53/56* | (2006.01) |
| *C01B 3/02* | (2006.01) |
| *H02N 4/02* | (2006.01) |
| *F23K 5/00* | (2006.01) |

(52) U.S. Cl. .......... 95/236; 423/210; 423/220; 423/235; 423/242.1; 423/245.1; 110/245; 110/347; 165/104.16; 165/104.11; 165/104.15; 310/11; 310/304

(58) Field of Classification Search ...... 95/42; 423/210, 423/220, 235, 242.1, 245.1; 110/245, 347; 165/1, 104.11, 104.15, 104.16; 310/11, 304
See application file for complete search history.

(56) References Cited

U.S. PATENT DOCUMENTS

| 3,430,081 A | * | 2/1969 | Zauderer | 310/11 |
|---|---|---|---|---|
| 3,531,664 A | * | 9/1970 | Hals | 310/11 |
| 3,720,850 A | * | 3/1973 | Way | 310/11 |
| 4,320,796 A | * | 3/1982 | Smith | 165/104.18 |
| 4,345,173 A | * | 8/1982 | Marchant et al. | 310/11 |
| 4,346,302 A | * | 8/1982 | Bozzuto | 290/1 R |
| 4,390,402 A | * | 6/1983 | Mani et al. | 204/538 |
| 4,540,554 A | * | 9/1985 | Dayen | 423/235 |
| 4,624,191 A | | 11/1986 | Zauderer | |

(Continued)

OTHER PUBLICATIONS

B. Zauderer et al., 11th Symposium, "Engineering Aspects of Magnetohydrodynamics", "Performance of a Large Scale . . . Rare Cases—Part II", Mar. 24-26, 1970, 7 pages.

(Continued)

*Primary Examiner* — Duane Smith
*Assistant Examiner* — Ives Wu
(74) *Attorney, Agent, or Firm* — Andrew M. Calderon; Roberts Mlotkowski Safran & Cole, P.C.

(57) ABSTRACT

Disclosed is a gaseous fossil fuel fired, indirectly heated, Brayton closed cycle comprising an alkali metal seeded noble gases that is rendered non-equilibrium, electrically conducting in a magnetohydrodynamic (MHD) electric power generator with zero emissions from the combustion products, including physical separation and sequestration of the carbon dioxide ($CO_2$) what is emitted from the fossil fuel, with said cycle combined with a Rankine steam turbine bottoming cycle to compress the noble gas, while another optional new or existing Rankine steam cycle is placed in parallel and separate from the MHD cycle, and it is fired by the solid char remaining if the MHD cycle is fired with the devolatilized coal, and/or with solid coal culm, and/or unburned carbon in coal power plant waste ash, in order to achieve high efficiency at low capital, low operating, and low fuel costs.

25 Claims, 4 Drawing Sheets

U.S. PATENT DOCUMENTS

| | | | | |
|---|---|---|---|---|
| 4,765,258 | A | * | 8/1988 | Zauderer ............ 110/347 |
| 4,851,722 | A | * | 7/1989 | Zauderer ............ 310/11 |
| 4,917,874 | A | * | 4/1990 | Sheth et al. ............ 423/242.7 |
| 5,055,724 | A | * | 10/1991 | Berry ............ 310/11 |
| 5,059,406 | A | * | 10/1991 | Sheth et al. ............ 423/244.08 |
| 5,105,747 | A | * | 4/1992 | Khinkis et al. ............ 110/345 |
| 5,265,424 | A | * | 11/1993 | Merritt ............ 60/648 |
| 6,048,510 | A | | 4/2000 | Zauderer |
| 6,453,830 | B1 | | 9/2002 | Zauderer |
| 6,554,061 | B2 | * | 4/2003 | Jukkola et al. ............ 165/104.16 |
| 6,722,295 | B2 | | 4/2004 | Zauderer |
| 7,247,285 | B2 | | 7/2007 | Zauderer |
| 7,282,189 | B2 | * | 10/2007 | Zauderer ............ 423/220 |
| 7,435,400 | B2 | | 10/2008 | Zauderer |
| 7,553,463 | B2 | | 6/2009 | Zauderer |
| 2003/0074883 | A1 | * | 4/2003 | Cirrito et al. ............ 60/39.34 |
| 2004/0201289 | A1 | * | 10/2004 | Kayukawa et al. ............ 310/11 |
| 2011/0173139 | A1 | | 7/2011 | Zauderer |
| 2012/0058042 | A1 | | 3/2012 | Zauderer |

OTHER PUBLICATIONS

B.H. Jennings et al. "Gas Turbine Analysis & Practice", 1953, 4 pages.

J.C. Corman et al "Energy Conversion Alternatives Study—ECAS—General Electric Phase II Final Report", Abstract, vol. I, 1976, 2 pages.

G.R. Seikel "A Summary of the ECAS Performance and Cost Results for MHD Systems", 1976, pp. 10-12.

B. Zauderer "System Studies of Coal Fired-Closed Cycle MHD for Central Station Power Plants", 1976, 5 pages.

C.H. Marston et al. "Design of 50 MW Closed Cycle MHD Blowdown Experiment", 1976, 3 pages.

EPA—Clean Air Market—all U.S. Power Plant Emissions—data & Maps—1995 to date, http:/camddataandmaps.epa.gov/gdm/index.cfm?fuseaction=emissions.wizard, last uploaded Jan. 14, 2012.

U.S. Congressional Record—Public Law 93-404 Sec, 107-MHD Program, Aug. 1974, pp. 814-815.

"Mission oriented Advanced Nuclear System Parameters Study", Final Report, vol. I, Abstract, 2 pages, TRW Space Technology Laboratories, Mar. 1965.

G.W. Sutton et al. "Engineering Magnetohydrodynamics", 1965, 3 pages.

R.J. Rosa "Magnetohydrodynamic Energy Conversion", revised 1987, 7 pages.

L. Crane "MHD Power Generation: More Energy from Less Fuel", No. IB74057, Sciency Policy Division, US Congress Office, Oct. 7, 1981, 4 pages.

"A Nation Strategy for Energy" by Washington based group, Securing America's Energy Future, http://www.fas.org/sgp/crs/misc/m012606.pdf, 1 page, Sep. 28, 2008.

Coal Tech Corporation "Demonstration of Coal Tech's low cost, slagging . . . existing coal power plants", Proposal to DOE Solicitation DE-FOA-0000042,2 p., Aug. 24, 2009.

B. Zauderer "Magnetohydrodynamic Interactions in Seeded Detonation Waves", Abstract, 2 pages, 1958.

C.S. Cook "Current Experimental Results from Operation of a Closed Cycle Regenerative Heat Exchanger", International Atomic Energy Agency (IAEA), Jul. 1968, 5 pages.

B. Zauderer et al. "Electricity from MHD" "Electrical Characteristics . . . MHD Generator", Proceedings of Symposium, Jul. 1966, vol. II, 9 pages.

B. Zauderer et al. "Electricity from MHD" "A Large . . . Generator", Proceedings of Symposium, Jul. 24-30, 1968, vol. II Closed-Cycle MHD with gaseous Working Fluids, 6 pages.

"Closed Cycle Gas Turbine by Escher Wyss Co.", pp. 118-119, 1953.

* cited by examiner

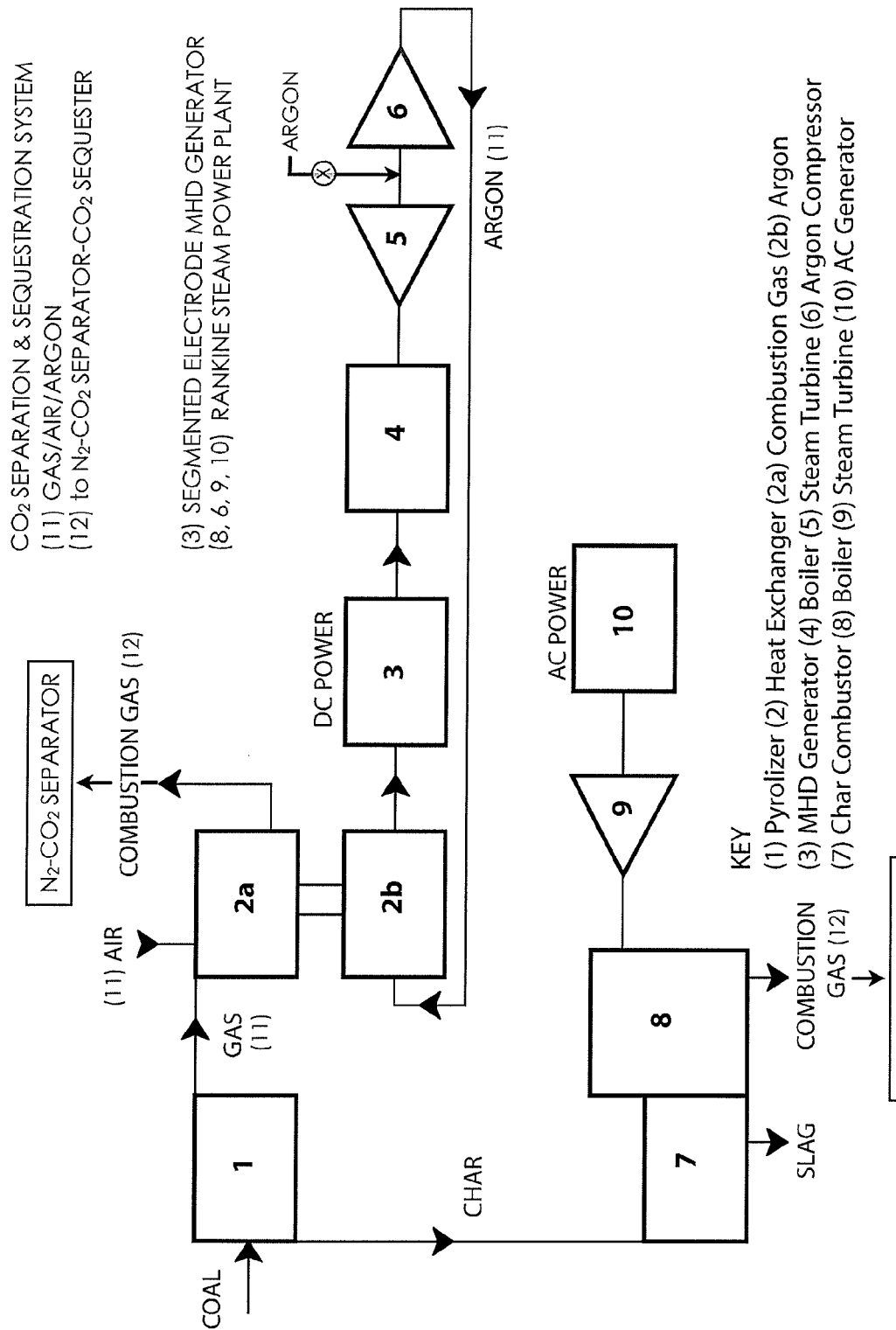

FOSSIL FUEL FIRED, CLOSED CYCLE MHD GENERATOR IN PARALLEL WITH STEAM TURBINE CYCLE WITH ZERO EMISSIONS AND $CO_2$ SEQUESTRATION

CROSS REFERENCE TO RELATED APPLICATIONS

The present application claims priority to provisional application Ser. No. 61/418,977, filed on Dec. 2, 2010, the contents of which are incorporated by reference herein in its entirety.

BACKGROUND OF THE INVENTION

1. Field of the Invention

The present invention relates to a gaseous fossil fuel fired, indirectly heated, Brayton closed cycle comprising an alkali metal seeded noble gases rendered non-equilibrium, electrically conducting in a magnetohydrodynamic (MHD) electric power generator with zero emissions from the combustion product, including physical separation and sequestration of carbon dioxide ($CO_2$) emitted from the fossil fuel, with said cycle combined with a Rankine steam turbine bottoming cycle to compress the noble gas, while another optional new or existing Rankine steam cycle is placed in parallel and separate from the MHD cycle, and it is fired by the solid char remaining if the MHD cycle is fired with the devolatilized coal, and/or with solid coal culm, and/or unburned carbon in coal power plant waste ash, in order to achieve high efficiency at low capital, operating and fuel costs. This MHD technology could also provide data that will facilitate future nuclear heated, closed cycle MHD power for terrestrial, water, space based MHD power.

2. Description of Related Art $CO_2$ Separation from $N_2$: Bert Zauderer in U.S. Pat. No. 7,282,189, dated Oct. 16, 2007, which by reference is incorporated herein in its entirety, disclosed processes and methods whereby carbon dioxide ($CO_2$) in the exhaust from the combustion in air of coal, and other fossil fuels, is physically separated from nitrogen ($N_2$) and sequestered in geologic limestone formations. Said $CO_2$ separation is implemented by pressurizing the $CO_2$ and $N_2$ gas mixture with water all at the same pressure and with sufficient water to dissolve the $CO_2$ in the water. The $N_2$ gas, which is essentially not soluble in water remains in the gas phase and is separated from the $CO_2$-water solution. The pressurized $N_2$ expands in gas turbines in order to recover most of the $N_2$ compression power.

In U.S. Provisional Application No. 61/380,913, dated Sep. 8, 2010, which by reference is incorporated herein in its entirety, Zauderer discloses methods whereby $N_2$ and $CO_2$ from fossil fuel combustion, from coal, coal waste, oil, or natural gas, are compressed from atmospheric pressure and ambient temperature to a nominal pressure in the 10 atmosphere range, with water in sufficient quantity, namely about 67 times that of $CO_2$, to dissolve the $CO_2$ in the water. The three streams are injected into a mixing chamber, preferably a horizontal pipe of sufficient length to enable the separation and removal of $N_2$ gas, which is driven by buoyancy to the top of said pipe from which it is removed and expanded through a gas turbine to recover almost all the $N_2$ compression power. Simultaneously, the $CO_2$-water solution is drained from the bottom of said pipe to a lower vessel at a rate that maintains the $N_2$ pressure in the mixing pipe at the injection pressure of the total water-gas mixture. The $CO_2$-water solution in the lower vessel exits to a third vessel at the same rate as it enters said $CO_2$-water solution vessel. The pressure in the third vessel is lowered toward atmospheric pressure, which re-evolves the $CO_2$ into the gas phase as it passes through an expansion gas turbine to recover most of its compression power. The $CO_2$ is then recompressed to about 1000 psi and injected into geologic limestone formations with sufficient water to form carbonic acid that dissolves limestone in geologic formations to form liquid calcium bicarbonate, which permanently sequesters the $CO_2$. The water is reused to repeat the $CO_2$ separation process.

To facilitate said $CO_2$ physical separation process without using massive amounts of water, said Zauderer patent and Provisional Application teach that the separation process be implemented at a reasonable pressure, such as the 10 atmosphere range. Also, to maximize the $CO_2$ concentration in the combustion gas exhaust, combustion would be implemented at a stoichiometric ratio (SR) of about unity. Using carbon only fuels, such as anthracite culm, coal char, or unburned carbon in fly ash, yields the highest $CO_2$ concentration of about 20%, by volume in the combustion gas exhaust with the balance being $N_2$. At this $CO_2$ concentration, Zauderer teaches that physical separation of $CO_2$ from $N_2$ can be economically implemented. This $CO_2$ concentration is double the 10% to 12% range reported for all current coal fired power plants, which to be effective requires chemical separation from the nitrogen, with amine being favored as evidenced with the billions of dollars being committed by the Department of Energy (DOE) and industry to this process. The amine process costs over $70 per ton of $CO_2$ that equals over $70 per MW of electricity, and it reduces current power plant efficiencies, which are in the mid 30 s % range, by about 26%.

Also, Zauderer's $CO_2$ process is implemented at 20%, which is 3 to 7 times the 3% to 6% $CO_2$ concentration by volume reported for natural gas fired turbine power plants. This low $CO_2$ of 3% to 6% makes chemical separations uneconomical in natural gas fired gas turbines, which operate at high excess air. Nevertheless, advocates of natural gas promote this fuel as being "clean", while failing to note that its $CO_2$ output is 50% of coal $CO_2$.

The $CO_2$ process in said Zauderer patent and provisional application are implemented by operating the combustors in boilers and gas turbines at SR=1, which will sharply increase $NO_x$ emissions. However, this can be corrected by post-combustion $NO_x$ control, as per Zauderer's NOx control U.S. Pat. No. 7,553,463, No. 7,435,400, No. 7,247,285, No. 6,722,295, No. 6,453,830, No. 6,048,510, No. 4,765,258, and No. 4,624,191, which by reference are incorporated herein in its entirety.

Reasons for the Low $CO_2$ in Current Coal Fired Boilers and Gas Turbines: In said Application No. 61/380,913, Zauderer's calculations show that the low $CO_2$ concentration of 10% to 12% in all coal power plants is most probably due to air infiltration leaks into the coal fired boilers. The minimal $CO_2$ concentration of 3% in gas turbine power plants is most probably due to major $CO_2$ dilution by air-cooling of gas turbine blades downstream of the combustion zone.

Eliminating boiler air infiltration would increase the $CO_2$ in coal fired boilers to near the 20% percent range, after the water moisture is condensed, which could make physical $CO_2$ separation economical, as disclosed in said Zauderer's Provisional Application.

As for gas turbines, replacing turbine blade-cooling air, with for example $CO_2$ gas, will increase $CO_2$ in gas turbines to the 10% range after water moisture condensation, without counting the $CO_2$ used for turbine cooling gas. Removing turbine blade air-cooling could make physical separation of $CO_2$ feasible in gas turbines with combustion at SR=1, as disclosed in Zauderer's Application No. 61/380,913. However, if the $CO_2$ needed for cooling the turbine blades is not excessive, it will increase the $CO_2$ concentration in the turbine exhaust thereby simplifying $CO_2$ removal but increasing the $CO_2$ separation power. This information on how much $CO_2$ is needed to increase the gas temperature without excessive $CO_2$ separation power can be readily obtained from gas turbine manufacturers.

Gas turbines operate in a Brayton cycle in which a gas fuel, such as natural gas, and air are injected into a compressor and burned in a pressurized combustion chamber, followed by expansion of the gas products through a turbine that is connected to an electric generator and finally rejected to the atmosphere. As noted above, cooling the combustion chamber walls and the gas turbine blades dilutes the exhaust gas with air by as much as 300% of the stoichiometric air fuel ratio, resulting in $CO_2$ concentration of only 3% in the exhaust, making chemical separation of $CO_2$ uneconomical.

The above changes in operating conditions increase $CO_2$ concentration in the combustion gas exhaust, namely, by closing air infiltration openings in coal fired boilers, and by replacing air cooling of turbine blades and other turbine components.

However, increasing the $CO_2$ concentration in the gas exhaust from gas turbines to 10% does not make physical $CO_2$ separation viable because the pressure in the exhaust of a Brayton open cycle turbine is one atmosphere and the temperatures are in the hundreds of degrees Fahrenheit. Therefore, separating $CO_2$ from $N_2$ requires additional gas cooling to ambient temperatures. This doubles the compression power for $CO_2$—$NO_x$ separation in gas turbines over that in coal fired Rankine cycles. Nevertheless, the solution of operating gas turbines at SR=1, which increases the $CO_2$ concentration at the exhaust to 11%, was disclosed in Zauderer's Provisional Application No. 61/380,913, Sep. 8, 2010 because it makes $CO_2$ physical separation still economical.

Indirectly heated, closed Brayton cycles: However, the present invention makes an even better $CO_2$ separation feasible for gas fired power systems. The present invention discloses the use of an indirectly heated, Brayton closed cycle that enables technical and economic $CO_2$ separation from $N_2$ in gas turbines even at low 10% $CO_2$ concentration by operating both the combustion heat source and the Brayton closed power cycle at elevated pressures. While this indirectly heated Brayton closed cycle has been commercially implemented with gas turbines, much higher efficiencies and more favorable economics can be obtained in another Brayton closed cycle, the non-equilibrium Magnetohydrodynamic (MHD) power generation cycle.

The following summarizes closed cycle gas turbine power and MHD power generators, as well as some relevant information on other power cycles:

Closed cycle gas turbines: The Swiss company, Escher Wyss, was the first company to sell closed cycle gas turbines between 1939 to the early 1950s. Metal temperatures limited to about 1300° F. resulted in low cycle efficiencies of about 30% based on Higher Heating Value (HHV) using oil or natural gas in very small power plants rated at several MW capacities. In 1950, this design was used on a 12.5 MW closed cycle plant in Paris, France, with a heat rate of 10,000 Btu/kWh, which equals 34.1% efficiency. Unlike open cycle gas turbines operating in the nominal ten-atmosphere range, this turbine ran at 700 psi and 1230° F., which resulted in very small turbines. At 18.5 MW and 3,000 rpm, the turbine tip diameter was only 42 inches maximum. The peak gas temperature in the metal heat exchanger that transferred heat from the combustion gas to the Brayton cycle gas was and remains to this day limited to about 1500° F. Air was initially the closed cycle turbine working fluid, although helium or carbon dioxide was also suitable. The heat exchanger is the primary limiting factor in terms of system cost and size. For examples in the Escher-Wyss plant the primary heat exchanger was about 30% of the total system weight.

In the 1960s, the Brayton closed gas cycle received renewed interest for use in gas-cooled nuclear reactors. After the 1973 oil energy crisis, advocates of this closed cycle proposed its use with coal fired, atmospheric fluid bed furnaces containing embedded metal tubes operating at 1500° F. peak temperature. Before continuing with the discussion of closed Brayton cycles an important relevant digression is necessary.

ERDA's Energy Conversion Alternatives Study (ECAS):

Before discussing the Closed Cycle non equilibrium MHD it is necessary to briefly present the results of ERDA's ECAS study of the mid-1970s because it was used to destroy this very promising technology. As such it offers a timely lesson of the adverse consequences of political and special interest interference in technology development, and how so-called objective "studies" were used to justify non-technical decisions. MHD power is a particularly good example.

The above gas turbine, Brayton closed cycle was one of about ten different power cycles that were evaluated for the Energy Research and Development Authority (ERDA), the forerunner of the Department of Energy (DOE), in the Energy Conversion Alternatives Study (ECAS) in the mid-1970s. The studies' stated objective was to determine which advanced power cycles should be developed to meet the U.S. goal of energy independence, an unmet quest that continuous to this day. Two parallel teams headed by General Electric and Westinghouse that included advocates of various power plant cycles were awarded contracts from ERDA. To evaluate the results of the power cycle analyses, ERDA selected the NASA Lewis, Cleveland, Ohio, R&D Center to critique the results and publish a critical assessment of the ECAS results. ERDA's goal was to determine which power cycles should be supported by the very huge increase in government funding available for energy after the 1973 oil embargo. The power cycles showing the most promise for high efficiency and most economical cost of electricity were to be selected for funding. The basis for comparison was the supercritical 3500 psig, 1000° F., 1000° F., Rankine steam cycle, which was an advanced version of the conventional steam turbine cycle. The other commercial cycle at that time that was extensively investigated was the Open-Cycle Brayton gas turbine with a steam turbine bottoming cycle. The other cycles analyzed were advanced power cycles with various R&D bases but with no commercial large-scale power plants in existence. They were:

The Brayton Closed Cycle gas turbine, discussed above and below,

The Closed Liquid Metal Vapor cycle with potassium as the working fluid. Its basis was the experience with the sodium-cooled nuclear reactor.

The Supercritical carbon dioxide cycle at 3800 psi, 1350° F.

The Brayton Open Cycle MHD that operates at 4500° F. with alkali metal seeded combustion gas to provide sufficient thermal equilibrium electrical conductivity to power very large MHD generators.

The Brayton Closed Cycle MHD that operates at 3000° F. stagnation gas temperatures with alkali seeded, noble gases that are rendered electrically conducting by non-equilibrium ionization at sub-sonic or supersonic gas velocities by the induced Faraday electric field in an MHD generator with commercially useful power outputs at several MW. The Open Cycle combustion MHD requires generators in the multi-100s of MW to be economically viable.

The Closed Liquid Metal MHD cycle using a liquid metal MHD generator

The Fuel Cell cycle

The stated objective for ECAS was to select advanced electric power plants for development to assist the US to achieve energy independence over a period of decades. As such the ground rules should have been selected for flexibility in meeting alternate energy scenarios. Instead the ground rules were set narrowly to maintain the status quo in electric power, namely:

Rule No. 1—Coal Only: Only coal was allowed as the fuel, and on top of that it had to be Illinois No. 6, a high sulfur bituminous coal Result: This rule was the most shortsighted decision of all. The government and industry assumed that natural gas would never be used for power generation, and Congress passed a law to this effect. It was repealed in the late 1980s when the utilities realized no coal power plants were being built due to the very high cost of meeting $SO_2$ and $NO_x$ emission controls.

On top of that there was a massive shift by utilities from high sulfur Bituminous coal to low sulfur, Sub-bituminous coal, mostly from the Powder River basin in Wyoming so that this coal now supplies one-half of USA use, whiles Illinois coal use is insignificant.

Rule No. 2—Coal sulfur removal: Since only high sulfur coal was specified, most cycles were based on atmospheric fluidized bed boilers, which can process high sulfur coal, but they are inefficient and very expensive. In some cycles, pressurized fluidized bed boilers that are even more costly were selected. The low Btu gasifier, or coal derived liquid fuels were used as alternate heat sources because they removed the high sulfur from coal. However, the substantial efficiency loss of 20% or more made these fuel sources unattractive.

A major advantage of open cycle MHD was the reaction of the potassium seed, which made the combustion gases electrically conducting, also reacted with the coal $SO_2$ with no impact on cycle efficiency, which was about 47%, the highest of all cycles analyzed.

In contrast, the use of low BTU gas or liquid coal lowered the efficiency of the Closed MHD Cycle to the high 30% range, which was unattractive, and increased the capital cost substantially. As a result Closed MHD Cycle was removed from the Phase 2 study, which resulted in cutoff of ERDA funds for development, as explained in the Closed MHD Cycle Section below. This decision was made despite a re-analysis by the Closed Cycle advocates that using direct coal firing of the heat exchangers increased the efficiency and reduced the capital cost to the same level as the Open Cycle MHD. The NASA Lewis team recommendation that the new result warranted further analysis was ignored by ERDA.

Result: As in Rule No. 1, the focus on high sulfur coal was not necessary and its major result was to move Open Cycle MHD with its internal $SO_2$ removal to the top of the list of cycles analyzed. Grossly underestimated by the advocates were the multiple barrier problems in developing an MHD power system that operates at the extreme 4500° F. temperature and requires 1000 MW power plants to be economical due to the low equilibrium electrical conductivity of the alkali metal seeded combustion gases. When the complexity and huge cost of Open Cycle MHD were confirmed by the late 1970s the Program was continued until 1981 when the new Administration terminated it after $400 million had been expended.

A second negative result of the ECAS ground rules was the focus on high sulfur coal. This led to selection of the sulfur removing, costly fluid bed combustion system as the primary heat source in most of the cycles analyzed. The few fluid bed boilers in operation in the USA today have confirmed the poor economics of the fluid bed. They are all listed in EPA's database on coal-fired power plants.

Rule No. 3. Selecting 1000 MW power Plants: A nominal 1000 MW electric output plant size was specified for all cycles, with some variations allowed.

Result: This Rule favored the large coal fired Rankine cycle steam plants, which currently account for one-third of all USA coal power plants and provide two-third of coal power production today.

Equally favored by ECAS were the gas turbine topping-steam turbine bottom plants. Incredibly, according to EPA's annual reports on emissions from power plants, not a single coal fired or coal derived gas or liquid fuel combined cycle is in operation in the USA at this time. Instead the combined cycle plants, with a few exceptions, are all fired with pipeline natural gas, which was forbidden in the ECAS study and by act of Congress in the 1970s. Their output is about equal to 25% of USA coal power, and about two-thirds of all gas power, with the balance used for gas turbine peaking power.

The third "winner" was Open Cycle MHD. However, its development was terminated in 1981 by the Reagan administration after expenditure of $400 million ($1.4 billion 2010 dollars).

Another pernicious result of forcing all the power cycles to a nominally 1000 MW size made, with the exception of the favored trio, all the others economically unattractive for the following reasons: The 1970s was a period of high inflation. To this was added the high contingency costs imposed by the engineering firms, Bechtel on the GE team. These costs were highest for the power cycles that had no commercial plants in operation. On top of this was the huge 1000 MW size that required 5 to 6 year erection periods. As a result about 50% of the capital cost of the advanced new technology power plants was from financial items, not from capital equipment. The result was that all new power cycles were rejected from future significant DOE support. Only Open Cycle MHD passed out of Phase 2 to major development funds from DOE. However, the $50 million annual Open Cycle MHD funds were from Congressional earmarks. The decade long test database of Closed Cycle non-equilibrium MHD predicted that an economically viable MHD generator as small as 10 MW was feasible and the commercial scale MHD generator could be demonstrated at a cost of only several million dollars. However, the Open Cycle MHD advocates made sure that the other two MHD technologies would not obtain any significant funding.

Rule No. 4—The Phase 2 ECAS study: The analyses were implemented in two phases, with phase 1 parametric studies, from which the supposed most efficient and lowest cost power plants were to proceed to the more in-depth phase 2. Therefore, non-selection of a cycle in Phase 1, as occurred for Closed Cycle MHD, meant no further ERDA/DOE funding.

Result: While the objective of Phase 2 was commendable, ERDA's using it to cut off some power cycles from further study and therefore from any funding was not. In fact it was against the interests of the United States because the entire ECAS project rested on one slender scenario, namely, high sulfur coal, which within a decade was found to be totally wanting, and it has remained so.

On top of this, this Rule was implemented in a biased manner for Open and Closed Cycles MHD power plants. In Phase 1, most of the Closed Cycle MHD parametric cases were with coal derived low Btu gas or liquid fuels, whose efficiency losses lowered the overall cycle efficiency to the low to mid-30% range. However, at the end of Phase 1 direct coal firing at one atmosphere increased the overall plant efficiency to 45.6% and with 4 atmospheres coal combustion to heat the 10 atmosphere peak pressure argon MHD cycle gas to 3000° F. through regenerative, cored brick heat exchangers increased the overall efficiency to 47%. This matched the best Open Cycle MHD efficiency, as well as the Open Cycle MHD capital cost. However, ERDA refused to allow Closed Cycle MHD to move to Phase 2, and it denied any chance for subsequent financial support.

Then during the recent re-examination of the ECAS study for the present invention, Zauderer discovered in the GE Phase 1 and Phase 2 Reports that the closed cycle helium gas turbine, which in Phase 1 had a base plant efficiency of only 31% at 1500° F. with an atmospheric fluid bed heat source, was allowed to proceed to Phase 2 in which the combustion gas-helium recuperative metal heat exchanger tubes in the atmospheric fluid bed heat source were replaced with silicon carbide tubes (SiC). This increased the overall efficiency to 39%. However, the very high cost of these tubes resulted in a capital cost that was double that of the advanced steam cycle and triple that of the combined open cycle gas turbine-steam turbine bottoming cycle.

Now this tube change in the heat exchanger was a much more significant change than the minor Closed MHD cycle change of direct coal firing and the 4 atmosphere pressurized combustor that increased the efficiency from the 30% range to 47%. Yet the CC-MHD Brayton cycle was not allowed to proceed to Phase 2, which resulted in the totally technically unjustified termination of 15 years of U.S. Office of Naval Research supported R&D by Bert Zauderer and his Closed Cycle MHD Group at GE's Aerospace Division in King of Prussia, Pa. Furthermore, this effort was the only one in either Open and Closed cycle MHD worldwide test projects that had demonstrated 20% MHD generation from the total gas enthalpy, which is required for commercial MHD power.

Interestingly, the helium gas turbine cycle advocates were from GE's Gas Turbine Group, and GE's Power Generation Group, which was also the ECAS lead contractor. The most plausible explanation is that this decision to cut off closed cycle MHD originated from Open Cycle MHD advocates because closed cycle MHD generators as small 10 to 20 MW output could be commercially viable. Since such small plants could be erected in about one year, the 50% capital cost from financial issues placed on the 1000 MW power plants would be reduced to less than 10% and the demonstration phase would be in the $10s million dollar range, not the Open Cycle 1000 MW plant that would cost a billion dollars.

Concluding comments on ECAS: The lack of zero emission, economical coal power that resulted from this flawed ECAS study led to massive over expansion of natural gas turbine power plants in the 1990s and their subsequent financial collapse by 2000 due to the massive increase in natural gas prices. This high cost in turn provided the basis for the current heavily subsidized by federal and State taxpayers and utility rate payer of "renewable" power of wind, solar, and biomass, none of which can provide continuous power, an issue that is discussed in Zauderer's Provisional Application No. 61/293,841, dated Jan. 11, 2010, which by reference is incorporated herein in its entirety.

Furthermore, none of these 1970s power plant studies considered $CO_2$ removal, a requirement that would have eliminated all these utility scale electric power plants studied in ECAS from consideration.

Applying Zauderer's $CO_2$ sequestration process to Brayton Closed Cycles. This is disclosed in the present invention. Said sequestration uses physical separation, instead of chemical separation, of $CO_2$ from $N_2$. It is implemented at a pressure considerably above one atmospheric, at around 10 atmospheres, which is a small fraction of the nominal 1000 psi $CO_2$ sequestration pressure required for geologic limestone formations. Using this intermediate separation greatly reduces the sequestration compression power. Furthermore, the $CO_2$ solubility in water is very water temperature dependent, and to minimize water use it must occur at ambient gas temperatures. This eliminates the use of conventional open cycle gas turbines because the combustion gas exhaust is at one atmosphere and several 100° F. Even if the exhaust gas is cooled to ambient temperatures, the very low solubility of $CO_2$ in water at ambient conditions requires an unrealistic 670 pounds of water per pound of $CO_2$. On the other hand at 10 atmospheres for example, which is a typical gas turbine open cycle peak pressure, Henry's Law reduces the required water for solubility to 67 pound per pound of $CO_2$, which is still high but doable as disclosed in Zauderer's U.S. Provisional Application No. 61/380,913.

Brayton Closed Cycle Magnetohydrodynamic (MHD) Power Plants:

The present Invention discloses using the indirectly fossil fuel fired, Brayton power cycle to provide high gas pressure in the fossil fuel combustion gas exhaust to facilitate effective physical separation of $CO_2$ from $N_2$. This closed cycle can also be practiced with gas turbines but with lower efficiencies than open cycle gas turbines. However, to achieve a very high, overall power plant efficiency of about 50%, the preferred closed cycle disclosed herein is the non-equilibrium Magnetohydrodynamic (MHD) Brayton Closed Cycle.

In this MHD cycle the gas turbine is replaced with an indirectly heated noble gas, preferably argon, seeded with less than 1% cesium, which are heated by ceramic regenerative heat exchangers from the combustion gases to a stagnation temperature of about 3000° F. This temperature is also in the range of the final preferred MHD generator heat source, namely a high temperature gas cooled nuclear reactor that was under development in the 1960s for use in a nuclear rocket program until cancelled in 1973. The argon-cesium expands through a subsonic nozzle to about Mach 0.9 or a supersonic nozzle to Mach 1.5 to 2. After supersonic expansion to Mach 2, the electron density, which determines the electrical conductivity is less than 0.1 Mhos/m in equilibrium at the static gas temperature of 1280° F., which is too low to be of use in an MHD generator. For this reason all the emphasis in the 1960s was on MHD power from alkali metal seeded combustion gases that were heated to stagnation gas temperatures of 4500° F. to 5000° F., using natural gas fired with air preheated to 2500° F. to 3000° F. or with oxygen at ambient temperature. However, even there the equilibrium electrical conductivity is well under 10 Mhos/m, which requires extremely large MHD generators in the 1000 MW range to provide useful power densities. Nevertheless, this combustion MHD, called Open Cycle-MHD, dominated worldwide MHD R&D in the decades of the 1960s and 1970s.

Around 1960 a researcher noted that an electric field could heat electrons in a cold gas, such as a mercury lamp, to an elevated electron temperature, which in turn would produce additional electrons by two or three body collisions in low ionization potential gases or vapors such as alkalis, especially cesium, to a range where the gas electrical conductivity would be high enough to generate MHD power. Other researchers noted that the induced electric field from Faraday's Law of Electromagnetic Induction could be used to heat the electrons from the equilibrium static gas temperature of 1280° F. in the gas flowing through an MHD generator to a 4000° F. electron temperature. This would increase the non-equilibrium electrical conductivity in a cesium-seeded noble gas, such argon to about 100 Mhos/m, which would produce high power density MHD power generation. One key requirement is to avoid any contamination beyond tens parts per million by molecular gases in which the molecular vibrational states would quench the electron energy.

This led to a worldwide effort to construct small (tens of KW heat input) electrically heated noble gas to 3000° F. for very small (several inches wide), MHD channels. The results reported in the mid-1960s were very disappointing with little to no MHD power generated.

Zauderer's first attempt to generate MHD power was in 1959 from 100 microsecond slug of cesium seeded, oxy-acetylene gas heated gas flow to about 5000° F. in a 5 cm diameter shock wave flowing through a transverse to the shock tube 2 Tesla pulsed magnet for under 100 microseconds. Very little electricity was generated because electric voltage probes in the MHD channel showed that the voltage drop across the cold boundary layer in front of the anode and cathode was about 100 volts, which equaled the Faraday induced voltage that equals the gas velocity times the magnetic field strength times the channel width.

In view of the large electrode wall voltage losses and the uncertain prospects of magnetically induced non-equilibrium ionization, Zauderer used a 5 cm diameter shock tube to heat xenon to about 14,000° F. where the xenon equilibrium ionization and electrical conductivity can reach 100 mho per meter, which was sufficient to produce power despite the anticipated nominal 100 volt electrode loss. As the shock strength was reduced to lower the gas temperature, the electric conductivity probes downstream of the MHD generator showed that substantial non-equilibrium ionization and enhanced electrical conductivity took place in the MHD generator.

Other researchers using shock tubes also reported non-equilibrium ionization and MHD power. However, as noted above, the bulk of the MHD work was implemented in electrically heated facilities whose MHD channel widths were in the few centimeter range, and no significant MHD power was produced. Despite Zauderer's presenting at MHD Symposiums extensive evidence on non-equilibrium ionization and the high electrode voltage loss in the 5 cm diameter shock tube, the evidence was not generally accepted. Instead, the failure of steady state experiments was attributed by theoreticians in plasma physics, as being caused by plasma instabilities. This meant that non-equilibrium ionization was not possible.

The U.S. Office of Naval Research (ONR) supported Zauderer's MHD work from 1962 on. In 1967, ONR approved the next step to design a 10 MW thermal power shock tunnel in which neon, seeded with 1% cesium, was heated to 2100° K (3320° F.). The downstream end of this 20-foot long, 1-foot diameter shock tunnel provided about 100-millisecond steady test time into a 1.2 meter long, 6 to 1 expansion ratio, MHD generator. It was connected in the Faraday channel mode, meaning segmented electrode pairs with equal width for the inter-electrode insulators, resulted in axial electrode width of 10 to 20% of the channel width. After extensive testing from 1970 to 1976, 20%, equal to 2 MW of electric power output from the 10 MW thermal energy in the shock tunnel at 3300° F. was extracted. This was and remains a MHD power extraction record from a closed cycle MHD generator. It is about double the best enthalpy extraction achieved in large 250 MW thermal open cycle gas fired combustion MHD generators in the USA and Russia. This result was duplicated in shock tunnel tests at Eindhoven University, the Netherlands, and it provided solid proof that non-equilibrium closed cycle MHD was a viable power source.

In the early 1970s, the management of GE where this closed cycle MHD work had been implemented since 1961, provided initial financial support, which was matched by the U.S. Electric Utilities' Electric Power Research Institute (EPRI) in Palo Alto, Calif., for the design of a 50 MW thermal MHD generator to be powered by a cored ceramic brick heat exchanger heated by natural gas to above 3000° F., with the combustion products evacuated to near vacuum, and the argon seeded with 0.2% cesium expanded in a 6 to 1 outlet-inlet expansion ratio in a 3 meter long, MHD generator inside a transverse 4 Tesla magnet, operating at a 78% of open circuit voltage load parameter. The computed enthalpy extraction was 32%. This is enough enthalpy conversion to obtain 1000 MW electric output in a 10-meter long MHD generator in a CC-MHD power plant at a 47% total efficiency. This result was obtained in Case 102A in the ECAS study discussed above.

The GE/EPRI funds were used to design a 50 MW thermal MHD facility and to design, fabricate and test a prototype gas fired, cored brick heat exchanger whose objective was to demonstrate that the argon could be heated to 3000° F. after the combustion gases were evacuated in order to reduce residual combustion gases to the 10 parts per million range. This would prevent these molecules from quenching the non-equilibrium ionization process.

After the 1973 energy crisis Congress appropriated large sums for energy development and this provided a major opportunity to move all MHD to the advanced demonstration stage. However, with the TMI nuclear accident at the same time, nuclear power was out, and also over concern on natural gas supplies Congress legislated that natural gas for power plants was not allowed, which left coal. All MHD OC-MMD advocates claimed that coal was a better fuel for the future. All potential open cycle barrier problems, namely 4500° F. gas temperatures, coal slag (liquid and vapor) and alkali (metal and vapor) depositions on MHD channel walls, combustor walls, hot gas duct walls, seed reprocessing, the need for huge 1000 MW generators, and the huge cost, were all considered solvable with sufficient financial resources. ERDA/DOE received $50 million annually ($175 million in 2010$), and a total of $400 million through 1981 ($1.4 billion today). All this money was expended on coal fired open cycle MHD. All entreaties to support Closed Cycle MHD as a backup technology were refused. The only plausible explanation for their position is that Open Cycle advocates were concerned that a 10 MW electric Closed Cycle MHD plant would be so inexpensive as to risk the shutdown of the Open Cycle MHD program. In retrospect this was not an idle threat because around 1981 the Open Cycle MHD Program was permanently shutdown by the new Administration. This was certainly due to the recognition that its problems were much more intractable that had been assumed earlier. At about the same time, the plan to construct a very large commercial scale MHD power plant in the former Soviet Union was also scrapped.

Throughout the 1970s DOE refused to provide funding of a few million dollars to erect and test GE's 50 MW thermal Closed Cycle MHD Generator. This shortsighted action has assured that there would not be MHD power in the future USA energy mix.

However, the present invention that discloses combining closed cycle MHD with $CO_2$ sequestration will very likely bring back Closed Cycle MHD in commercial and government use.

SUMMARY OF THE INVENTION

This invention involves a totally unanticipated perfect match between a pressurized gaseous fossil fuel combustion system that indirectly heats a Closed Cycle MHD generator power plant and removes $CO_2$. 35 Years ago, the purpose of pressurized combustion was solely to reduce the cost of the heat exchangers that transferred the coal combustion energy to the closed cycle inert gas, argon. Now, by an incredible unanticipated coincidence, pressurized combustion is now technically and economically applicable to Zauderer's recently patented process for the physical separation of carbon dioxide from nitrogen. "Incredible" is appropriate because $CO_2$ sequestration was not even on the horizon in the mid-1970s.

The origin of the current match with Closed Cycle MHD began with R&D in 1961. By the early 1970s, after a decade long continuous minimal cost research effort the feasibility of non-equilibrium conductivity MHD power generation was proven and the technology was at the point of commercial demonstration as a compact and efficient new power source from fossil and nuclear fuels. Yet all work was stopped when DOE used the biased ECAS study as justification to stop the decade long U.S. Office of Naval Research sponsorship on Closed Cycle MHD on grounds that ECAS showed that this power cycle was inefficient and un-economical. At the time energy R&D was transferred to the new ERDA/DOE agency. Had this work continued at a DOE investment of less that 10% of the $400 million that was expended on Open Cycle MHD, Closed Cycle MHD would almost certainly have been implemented in commercial scale demonstration in a low cost 10 MW power-plant by the early 1980s.

This present new $CO_2$ application is a direct result of Bert Zauderer's decision in 1981, after GE shut down his MHD Group and laid off the entire staff following DOE's announcement of no new MHD funds, to follow the science and form Coal Tech Corp to focus on the development of an air-cooled slagging combustor that was to be used in the CC-MHD plant. At no time was there any thought that pressurized combustion might one day offer a unique solution for physical $CO_2$ separation from $N_2$ as part of a closed cycle MHD generator plant in a modified ECAS Case 102A configuration.

Another erroneous decision at that time was the ECAS team's dismissal of the parallel CC-MHD plant as being inefficient and too costly. Here again no one thought that a parallel coal fired CC-MHD plant, as is disclosed herein, in which the "clean gas" fuel derived from coal volatiles would power the CC-MHD plant, and the devolatilized coal char would power in parallel a steam turbine power plant driven by the closed-cycle MHD derived, air cooled slagging combustor, as a new and important variation of the power plant in Zauderer's U.S. Pat. No. 7,282,189, which by reference was incorporated herein in its entirety.

As noted above, the primary flaw in that ECAS study was that it was based on the grossly erroneous prediction that only "clean coal" would be the fuel of the future with natural gas and nuclear to be terminated. Instead the opposite has happened. Very few coal power plants have been erected in the past 30 years while an enormous number of natural gas fired peaking turbine and a large number of gas fired combined cycle gas turbine-steam turbine power plants were erected in the past two decades to the point where USA gas turbine capacity exceeds existing coal power capacity. However, only about 25% of U.S. gas turbine capacity is used, partly due to the high cost of natural gas.

Also, the current favoring of natural gas as the supposed infinite new supply of domestic natural gas from "fracking" trapped gas in underground shale formation, mainly the Barnet shale in Texas, and Marcellus shale in Appalachia has two major flaws.

One is the huge water supply required to frack the shale, which becomes contaminated with chemicals added to the fracking process. In Pennsylvania's Marcellus shale the water required to extract this "bounty" of gas is about equal to the State's potable water use. This issue is discussed in Zauderer's U.S. Provisional Application No. 61/380,913, where it is disclosed that sequestered liquid $CO_2$ can be used to replace the water needed for fracking, and which by reference is incorporated herein in its entirety.

Two is a potential "show stopper" for all gas use, namely, while coal releases about 1 ton of $CO_2$ per MW of electricity, natural gas releases about ½ ton of $CO_2$ per MW. In addition, the very low concentration of $CO_2$ of only 3% to 6% in the combustion gas exhaust makes it uneconomical to remove the $CO_2$ from $N_2$ by chemical means. Electric utility executives have recently stated that this concern is preventing a rush to erect gas-fired power plants. It may also explain why the small companies that pioneered shale gas exploration are selling their shale gas leases to large companies Fortunately, here also, the physical $CO_2$ separation process disclosed in the present invention solves the removal of natural gas fired $CO_2$ economically. The use of $CO_2$ to replace the water used for fracking was disclosed in Zauderer's September 2010 Provisional Application No. 61/380,913, which will remove the water pollution problem.

The application disclosed herein is focused on particulate free, fossil fuels, primarily natural gas, methane from coal gasification, methane from volatile matter in coal, and hydrogen from coal. Also, "clean" gas from devolatilized waste from municipalities or industrial processes, or even "green" fuels, namely agricultural waste, which emit $CO_2$ now while waiting for new growth to offset it, can be used for the present $CO_2$ removal process. Current gas turbine power operations are mostly in the 3% to 4% $CO_2$ concentration (by volume) range due to high excess combustion air. This makes $CO_2$ separation even by chemical means uneconomical. In contrast, the current disclosed method is implemented at a stoichiometric ratio of unity, which increases the $CO_2$ to 10% by volume. As such, it appears to be the only economical means to remove $CO_2$ from gas fired power plants. Also as noted above, it totally changes the economics of the direct coal fired closed cycle MHD where Case 102A matched the best open cycle MHD case for efficiency, capital, and operating costs. The inclusion of $CO_2$ separation makes gas fired closed cycle MHD power the most efficient and lowest cost zero emission technology, including over renewable wind and solar and so-called "green" technologies, such as biomass.

The use of gas firing disclosed herein for closed cycle MHD replaces the costly less efficient multiple cycled ceramic heat exchangers, numbering 14 huge ceramic units, in the 1000 MWe atmospheric coal combustion ECAS Case 102 or 10 equally sized heat exchangers in the 4 atmosphere pressurized coal combustion Case 102A, with 1 to 4 gas fired falling packed pebble bed heat exchangers.

The use of clean gas instead of coal also removes the very costly wet $SO_2$ scrubbers, whose only purpose was $SO_2$ removal from Illinois #6 high sulfur coal, which in any case would not be used now due to the availability of low sulfur coal.

Furthermore, the high revenue potential from practicing Zauderer's Provisional Application No. 61/293,841 from the sale of electricity, cementitious slag, and $CO_2$ emission credits eliminates the need for direct coal fired closed cycle MHD because Zauderer's air-cooled, slagging combustor fired with coal char or coal waste would be placed in existing or new steam Rankine cycle power plants alongside the gas fired MHD plant.

This new invention can also be applied, at lower efficiency and higher cost due to lower peak temperatures, to a Brayton closed cycle gas turbine in place of the MHD generator. However, this gas turbine is not the high-pressure (about 1000 psi) helium cycle used in the ECAS study with either a fluid bed furnace with embedded 1500° F. metal tubes or a fluid bed with embedded 1800° F. silicon carbide to heat the gas turbine gas. Instead it would use the ceramic regenerators used for the MHD cycle. However, using the ECAS helium gas turbine with metal heat exchangers at 1500° F. is also possible if efficiency or cost is not as important as $CO_2$ removal.

In addition, this invention discloses that using this closed cycle MHD generator with natural gas will provide the database for high temperature gas cooled nuclear reactors for terrestrial power on land and sea, and for extra-terrestrial space unmanned and manned travels. While these applications have been proposed for many decades, their use with MHD generators will be unlikely without the technical and operational experience of the fossil fuel MHD cycles disclosed herein. In other words, the investment and risks on using nuclear heat sources will almost certainly not be undertaken before the full commercial capability of fossil fuel fired closed cycle MHD is implemented.

BRIEF DESCRIPTION OF THE DRAWINGS

The present invention is described in the detailed description, which follows, in reference to the noted plurality of drawings by way of non-limiting examples of exemplary embodiments of the present invention.

FIG. 4 is a schematic of how the closed cycle MDH plant would be fired by gas fuels derived from coal volatile matter while the residual solid char fires a steam turbine power plant.

Figure 1:
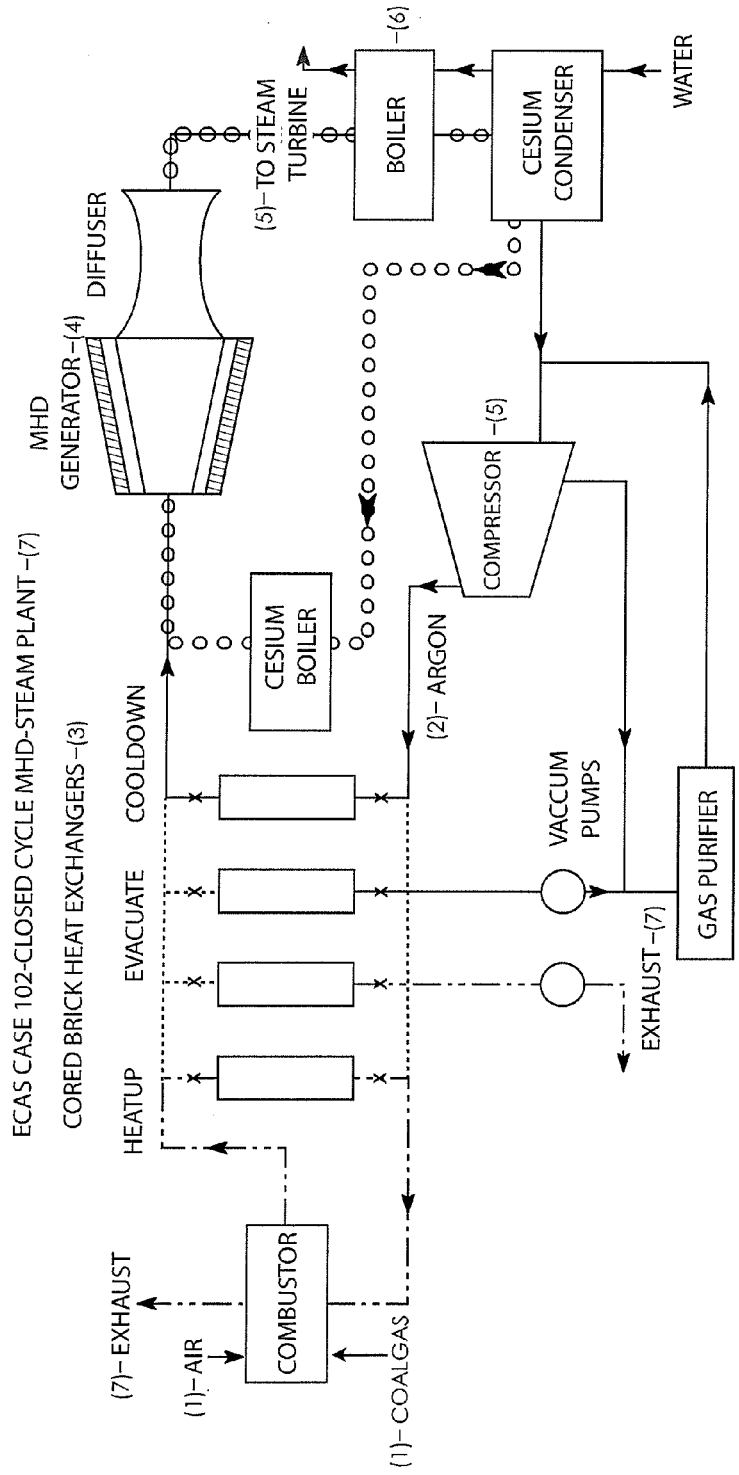
FIG. 1 is side schematic drawing of the arrangement of the components in the closed cycle MHD power plant that was studied in the 1970's ECAS project. Its purpose is to highlight pressurized combustion heating of noble gases in regenerative heat exchangers for closed cycle MHD power plants.

DETAILED DESCRIPTION OF EMBODIMENTS OF THE INVENTION $CO_2$ Separation from $N_2$ and its Sequestration: Separation of $CO_2$ from the exhaust of fossil fuel fired power plants is the primary technical and economic challenge facing fossil fuel fired power plants. The problem is the low concentration of the $CO_2$ in the plants' gas exhaust. In coal plants, $CO_2$ in the gas exhaust is 10% to 12% by volume that yields about 1 ton per MW electric output. The method currently favored by DOE and industry is chemical separation of the $CO_2$ from the exhaust of $N_2$ by amines, followed by its liquefaction, compression and transport to an underground sequestration site. This reduces the coal plant efficiencies by about 26% at existing plants at a cost of about $76 per $CO_2$ ton removed, of which one-half is for the amine process, and compression and sequestration each account for one-quarter.

In contrast Zauderer's U.S. Pat. No. 7,282,189 teaches physical separation of $CO_2$ by solution in water as carbonic acid and compression in one step to a nominal 1000 psi where 6.7 lbs of water per lb of $CO_2$ at ambient temperatures are required for sequestration as carbonic acid by dissolving it in underground limestone formations. For a 221 MW power plant in which the coal's volatile matter is converted to hydrogen to power gas turbines and the residual char is fired into air-cooled slagging combustors in a steam Rankine cycle boiler, the total $CO_2$ power consumed is only 14%, i.e. one-half of chemical separation.

This physical separation power is further reduced by a two step process in Zauderer's U.S. Provisional Application No. 61/380,913, dated Sep. 8, 2010, in which the $CO_2$ separation from $N_2$ is implemented at 147 psi, followed by $CO_2$ re-evolution as a gas from the water, and only $CO_2$ compression to 1000 psi for sequestration. This further reduces the entire $CO_2$ process power to 26.5 MW, or 12% of the plants total 221 MW.

A noteworthy step in said Provisional Application is the teaching to operate the solid, or liquid, or gaseous fossil fuels at a stoichiometric ratio of unity because that maximizes the $CO_2$ concentration in the combustion gas exhaust, namely to about 20% for coal or coal char (versus 11% in current coal power plants), and to 11% for natural gas or pyrolized coal volatiles gas (versus 3% current gas fired power plants) after which the $H_2O$ in the exhaust is condensed at ambient temperatures. Applying this process to natural gas enables physical separation of its $CO_2$, while chemical separation at this low concentration in uneconomical. This is proven by the failure of promoters of natural gas, who focus on "clean gas" as the solution to "dirty coal", to mention that $CO_2$ removal from the coal is economically feasible but it is not economically feasible from gas.

The teaching on $CO_2$ removal from gas fossil fuels in Provisional No. 61/380,913 has led to the present novel Application of $CO_2$ removal from a Closed Cycle MHD power plant whose noble gas, argon or helium, is indirectly heated in ceramic, falling pebble bed heat exchangers by a pressurized natural gas or gas from coal volatile matter.

By coincidence the ideal suitability of this Closed Cycle MHD power plant with pressurized coal combustion (but not natural gas which was forbidden by the ECAS shortsighted ground-rules) was proposed by Zauderer in Phase 1 of the 1970s ECAS power plant study as a solution to achieving high overall efficiency of 47% and low cost of electricity that would match the values claimed by the 4500° F., open cycle combustion MHD generator plant and exceed those of steam power and combined turbine-steam turbine power plants However, the ideal suitability of pressurized CC-MHD for $CO_2$ removal was not recognized until now because $CO_2$ removal was not on any agenda in the 1970s. In fact, since the entire MHD community dismissed closed cycle MHD, it is unlikely that anyone would have noticed this application for $CO_2$ removal. Also as stated in the Summary Section above, the objective of the ECAS study that was to advise the U.S. government on which power plant technology could produce the best technical and economic benefits to the USA in solving the 1970s energy crisis. However, it was limited to coal only and on top of that to high sulfur Illinois No. 6 coal. Although very low sulfur Western USA sub-bituminous and lignite coal were supposedly considered, which would have made advanced power cycles more economically attractive by removing costly $SO_2$ scrubbers, it was not a factor in the selection process. As a result the three "winners" (1)

Advanced steam plants and (2) Combined gas-steam turbines plants, both equipped with the favorite at the time of the coal combustion fluidized bed furnaces, and (3) Open Cycle MHD with its internal $SO_2$ removal but with its huge technical and economic barriers resulting from operating at 4500° F. and higher, received most of the DOE funds in the 1970s. However, none of these technologies played a significant role in new coal power generation to this day. Fluid bed boiler power plants are an insignificant small fraction of coal-fired power plants today because it was a lot cheaper to switch to Western low sulfur sub-bituminous coal or to install stack gas scrubbers for $SO_2$ removal. The worst fate befell the entire field of MHD power. When the government recognized that the very high temperature OC-MHD was a long term, very costly technology with dubious chances of success, the new Administration stopped further funding in 1981 after the expenditure of $400 million, ($1.4 billion in today's $) in the previous decade. The refusal of OC-MHD advocates in the mid-1970s to support any funding for Closed Cycle MHD, including the GE estimated $3 million, 50 MW (thermal), 15 MW (electric) MHD power, 1 minute blow-down test in the early 1970s (see below) meant that there was no backup to keep MHD development going forward, and the promise of MHD power was not realized.

ECAS Case 102A-1000 MWe Pressurized Coal Combustion, Closed Cycle MHD Power Plant:

In order to describe the indirectly gas fired Closed Cycle-MHD power plant disclosed in the present invention it is necessary to first describe the pressurized direct coal fired combustion, CC-MHD plant studied in ECAS (See FIG. 1). Coal combustors that removed 90% of the coal ash, or ash-free coal derived gas or liquid fuels would cyclically heat, a number of regenerative ceramic heat exchangers, while others would be purged of combustion gases, and still others would heat to 3000° F. in the evacuated heat exchangers the argon-seeded with cesium, which then flowed into an MHD generator to extract 1000 MWe. The argon exiting the MHD generator would enter a steam boiler to power the bottoming plant. The MHD generator provided all the 1000 MW net power, while the steam plant powered the argon compressors. The best result was obtained with pressurization of the combustion process, and it was labeled as Case 102A.

FIG. 1 shows the sub-systems in the power plant, with their names marked by component numbers that refer to a legend in the figure. The plant comprises a coal combustion system centered on a slagging, cyclone coal combustor, such as is shown in a sketch in FIG. 2 in Zauderer's U.S. Pat. No. 7,282,189 for an air cooled version of this combustor, which by reference is incorporated herein in its entirety. The pulverized coal particles burn in the cyclonic swirling airflow in the combustor's cylindrical chamber. The coal ash melts at about 2000° F. and at least 80% of the liquid droplets, called slag, impact the combustor walls and flow to the slightly downstream inclined combustor floor where it is drained through an opening into a water filled tank for quenching. It was assumed that the ECAS combustor and some undefined downstream particle separation component would remove as much as 90% of the liquid ash. Tests in the 1990s in a 20 MMBtu/hour, air-cooled slagging combustor indicated 90% ash retention with higher swirl from a 100 hp versus a 50 hp blower.

The balance of the liquid ash droplets, which are all less than 10 microns in diameter in a 3390° F. combustion gas, flow through an assembly of vertical cylindrical, cored brick, heat exchangers. For the atmospheric combustor Case 102, there were 14 heat exchangers, with a ceramic, mostly alumina, cored brick with 1 inch hole diameter, resulting in a 35% void fraction in the 21 ft. diameter, 60 ft. high brick assembly, placed within a ceramic insulated shell. The hole size was derived from decades of experience with cored-brick heat exchangers used to heat air in blast furnace steel mills. The ash concentration in said mills and test results performed in a small cored brick heat exchanger at GE's closed cycle MHD group under this inventor's direction indicated that 1 inch diameter holes would be more than adequate to prevent plugging of passages with the remaining 10% ash in the combustion gases. The size of the hole is a critical factor in the cost of these massive heat exchangers and overall plants costs were a function of the hole size.

In the post-Phase 1 analysis called Phase 1A, two direct coal fired CC-MHD plants were analyzed. Case 102 was with atmospheric coal combustion, while Case 102A was with 4 atm. pressure coal combustion. Both heated the argon at 10 atm. For Case 102, the 14 heat exchangers underwent a 70 minute cycle, with 1 unit in 5 min. argon evacuation, 8 units in 40 min. combustion gas heat up, 1 unit in 5 min. combustion gas purge and 4 units in 20 min. argon gas heat up to 3121° F. These heat exchangers were for the atmospheric pressure case.

The pressurized combustion case 102A was selected to reduce the number of heat exchangers from 14 in Case 102 to 10 in Case 102A. No net power was extracted from the combustion gases. Instead the air was compressed to 4 atm and fired with coal to 3390° F. After the gas is cooled in the ceramic heat exchangers, the combustion gases expand through a gas turbine to drive the combustion air compressors. As a result, no net power is generated from the combustion gas turbines.

In both Cases 102 and 102a, the argon gas is then seeded with less than 1% cesium, which is injected after purification of the cesium at the downstream end of the steam bottoming components. The Ar—Cs flows through a subsonic-supersonic nozzle from Mach 1.5 to 2. This lowers the stagnation temperature from 3121° F., to 1581° F. or 1089° F. static temperature for Mach number, (M), 1.5 or 2, respectively. The argon then enters the linear MHD generator where the cesium electrons are heated to between 4000° K to 5000° K by the transverse induced Faraday electric field that equals the product of the transverse orthogonal magnetic field from a 6 Tesla super-conducting magnet times the gas velocity. This increases the ionization of the cesium to yield electrical conductivities of about 100 mho/m.

Early in the non-equilibrium MHD generator test effort in the 1960s the following equation was used:

$$T_e/T_o = 1 + [\gamma(1-K)^2 M^2 \beta^2]/[3\delta] \tag{1}$$

where $T_e$ is the electron temperature, $T_o$ is the stagnation gas temperature, (3580° R), $\gamma$ is the ratio of specific heats, (1.67 for Argon), K is the load factor=V/UB=0.8 for ECAS 102A, $\beta$ is the Hall parameter that equals the electron cyclotron divided by the collision frequency, and depends on the magnetic field in Tesla, In ECAS Case 102A, $\beta$ was calculated at 15.2 at 6 Tesla. However, due to plasma turbulence, the effective $\beta_{eff}$ was 4.7. $\delta$ is the electron energy loss parameter, which is a multiple of twice the electron mass divided by the gas mass, which is taken as unity for noble gases, such as argon. $\delta$ is primarily of interest when diatomic and tri-atomic gases are used. It has been measured as a function of electron temperature, and at 4000° F. it is 3.4 for $H_2$, 7.8 for $N_2$, 230 for CO, and 2500 for $CO_2$, and about the same for $H_2O$. This means that tri-atomic molecules, and even in diatomic molecules with different atoms, there is no non-equilibrium electron heating, as is the case for combustion MHD. (This simple fact should have convinced Open Cycle MHD advocates of the futility of their quest. Instead they convinced the government not only to expend huge sums to increase the gas temperature to the electron temperature, but they made sure Closed Cycle MHD funds were cut off.) On the other hand, $H_2$ can be used due to its low weight, and probably $N_2$ under higher gas temperatures.

Equation (1) shows that with β of 15.2, $T_e/T_o$ would be 12.6 and Te would be 45,120° R, which is ridiculous. Equation (1) started the stampede into non-equilibrium MHD in the early 1960s. However, when non-equilibrium failed to materialize, theoreticians claimed that this was due to plasma instabilities, which prevented non-equilibrium electron heating. However, experimentalists working with disc generators, which has no segmented electrodes in the gas flow direction, found that these instabilities reduced the effective $β_{eff}$ to 2 to 3 for β of 4 to 6, and $β_{eff}$ decreases to 1 to 2 for β is 11, but this did not inhibit electron heating. Other researchers claimed that a plasma turbulence parameter should be used to obtain a $β_{eff}$. For Case 102, this turbulence parameter was 0.2, and this reduced the above 13 of 15.2 to a $β_{eff}$ of 4.7, which should be enough for electron heating. With $β_{eff}$=4.7 in equation (1) $T_e/T_o$ is 2.11 and $T_e$=7554° F. In another case, the plasma turbulence parameter was 0.5, and for β of 14.5, $β_{eff}$ was 2.2. In this case K was lowered from 0.89 to 0.84, yielding $T_e$ of 3516° F. The enthalpy extraction was 39% and 34%, respectively, and channel isentropic efficiency was 78% and 73 percent respectively. These two case show that this turbulence theory is mostly empirical. However, tests in the ONR shock tunnel at GE yielded over 20% enthalpy extractions at 3000° F. gas temperatures, which proved that non-equilibrium MHD works. Therefore, the ERDA/DOE decision to cut off CC-MHD when minimal funds could have allowed continuing is inexcusable.

Now these results must be applied with caution to $H_2$, and $N_2$. Equation (1) indicates lower electron heating. However, the lower molecular weight of $H_2$ and even $N_2$ compared to argon, and the possibility that plasma instabilities may be less due to damping by the vibrational states, and more important, by increasing the peak temperature to higher levels, such as 11,250° R with beryllium, as disclosed in Zauderer's U.S. Pat. No. 4,851,722, may more than offset electron collision losses.

Figure 2:
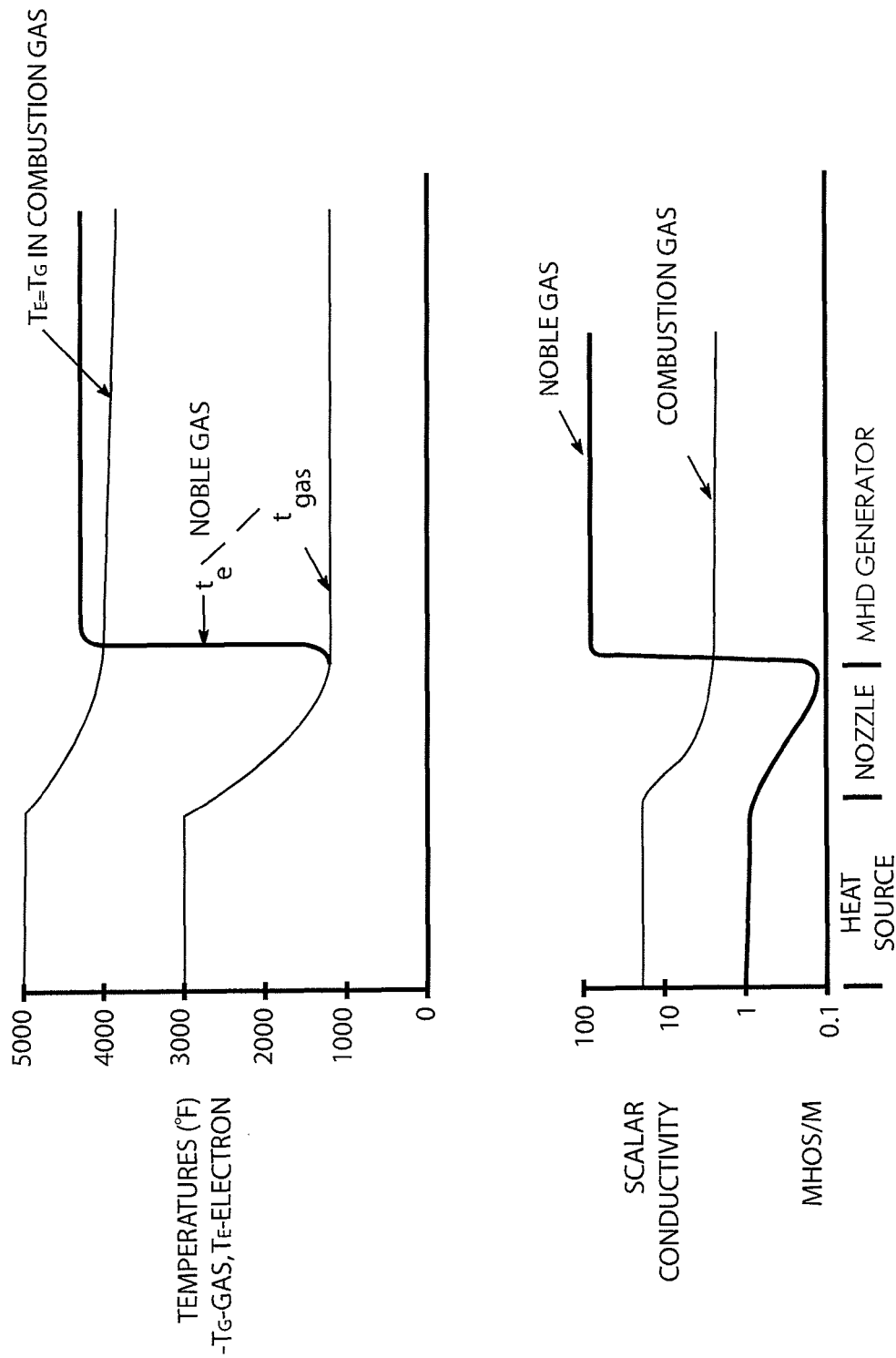
FIG. 2 shows the difference in gas and electron temperatures and electrical conductivity between the Open Cycle seeded combustion gas MHD generator and the Closed Cycle seeded noble gas non-equilibrium MHD generator.

In summary, the gas and electron temperatures and conductivities for both the open cycle combustion MHD generator and the closed cycle argon-cesium are shown in FIG. 2.

This enhanced non-equilibrium electrical conductivity is the most important advantage of closed cycle over open cycle MHD where the conductivity is under 10 mhos/m. It means that the CC MHD generator can be 10 times smaller that OC-MHD and still deliver efficient power in a large channel that reduces the impact of wall voltage losses. Furthermore, open cycle advocates asserted that coal slag covering the electrodes on the generator wall was a major advantage, and it justified direct coal firing MHD generators. In reality, what most likely occurred in the larger open cycle MHD generators was the voltage drop at the electrode wall boundary layers was high enough to strike electric arcs that penetrated the slag layer to the electrodes. In long-term use in power plant operation these arcs would destroy the electrodes.

To compensate for the low conductivity of open cycle combustion MHD, (OC-MHD), the ECAS study used a 6 Tesla magnet, while CC-MHD with its over 10 times greater electric conductivity, used 4 Tesla. However, in Phase 1A, a 6 Tesla magnet was used for the CC-MHD Cases. This shortened the MHD generator length from 15 meters at 4 Tesla to 10 meters at 6 Tesla, which enabled the much more compact vertical mounting of the MHD generator and diffuser. This greatly reduced the capital cost below the longer horizontal MHD generator.

ERDA specified that all power systems studied in Phase 1 should be implemented at 1000 MW electric output, although some systems were analyzed at lower power levels. As stated below, this worked against the CC-MHD plant.

After pressure recovery in a diffuser, the argon-Cs is cooled in a steam boiler that drives a steam turbine whose entire output is used to drive the argon compressors. Unanticipated at the time or until now was another benefit of using the steam power for gas compression. This favors the present application of $CO_2$ separation because the argon is cooled to near ambient conditions. This facilitates cooling of the combustion gases to the ambient conditions needed for $CO_2$ separation from nitrogen at reasonable water to $CO_2$ mass ratios.

The Phase 1A supplemental CC-MHD Cases that used direct coal fired heat input resulted in a coal-to-bus bar total efficiency of 47.4% and a capital cost of $1015/KW for the pressurized combustion Case 102A.

This compared to the Open Cycle MHD Best Case #1 of 48.3% and $1102/KW. (This cost was reduced to $718/KW in Phase 2.)

In the Phase 1 Closed Cycle MHD, "clean" low BTU gas and "clean" liquid coal derived fuel was used, where about 20% efficiency is lost in conversion from coal to clean fuel. This reduced the overall efficiency from the high to the low 30% range. The clean fuel also increased the capital cost. Phase 1A was implemented after the completion of Phase 1, and it produced a much improved performance and economics for the Closed Cycle MHD power plants.

Despite matching the best OC-MHD cycle, ERDA (DOE forerunner) refused to have CC-MHD proceed to Phase 2, which prevented any DOE funding for this technology. This decision negated 15 years from 1962 to the mid-1970s of very successful Closed Cycle MHD power R&D under the support of the US Office of Naval Research.

The Adverse Long Term Consequences of the 1970s ECAS Ground Rules:

It would seem that the role of government sponsored R&D should have a substantial focus on technologies that show steady progress over years of R&D and have a huge potential if successful, even though commercialization may never materialize. Instead since its formation in the 1970s and continuing to this day, DOE has overwhelmingly focused on technologies that appear to have a near term payoff on which it provided huge sums of money. A Report "A National Strategy for Energy" by a Washington based group, Securing America's Energy Future (Sep. 28, 2008) cites that the Congressional Research Service found 12,531 (Congressional) separate earmarks, totaling more than $37 billion in DOE's budget for FY1994, FY1998, FY2000, FY2002, FY2004, FY2005". As a result funds for development of other technologies are not available, such as those disclosed for example on total $CO_2$ sequestration in Zauderer's U.S. Pat. No. 7,282,189, Application No. 61/380,913, Application No. 61/293,841, and the present Application. Anther example is a proposal submitted to DOE by Coal Tech Corp in August 2009 for construction of a commercial 25 MW coal fired power plant with efficient and profitable total physical $CO_2$ removal. It was rejected within a few weeks by DOE for reasons that showed it was superficially read. This proposal was submitted in a solicitation in which DOE awarded $2 billion as its one-third total project cost share on multi $100s million demonstration projects for the costly, inefficient, chemical sequestration of $CO_2$. Interestingly one major electric power company withdrew from the chemical based $CO_2$ project after expending about $15 million of DOE's multi-100 million share of the project. This shows that the focus on currently favorite technologies that are very costly began with MHD at DOE's formation in the 1970s, and it continues to this day.

As in the above $CO_2$ examples the ERDA ground rules were set to facilitate selection of the favored large and costly technologies, especially with advanced steam turbines, open cycle gas turbines and open cycle MHD. The 1000 MW baseline seemed to favor open cycle MHD. However, analysis of MHD power leads to the opposite conclusion that favors closed cycle MHD, namely:

$$\text{MHD power output, } P = \sigma * U^2 * B^2 * (K) * (1-K), [MW/m^3], \qquad (2)$$

where $\sigma$ is the electrical conductivity in mhos/m, U the gas velocity, B the magnetic field, and K is the generator load factor which equals the voltage drop on the external load per anode/cathode divided by Faraday's induced electric field, $U*B$. Now U is in the same range for both MHD cycles, as is B. Therefore, referring to FIG. 2 herein, one notes that the conductivity for seeded noble gases is over 20 times greater that in seeded combustion gases.

Therefore, ECAS should have analyzed the Closed Cycle MHD in the 10 to 100 MW range. In fact Zauderer's MHD Group at GE had at that time a complete design for a 50 MW thermal, 15 MW electric, one minute blow-down, MHD generator test with argon, seeded with cesium ready for construction.

By forcing CC-MHD to the 1000 MWe output and forcing the use of coal with high sulfur content, the advantage of CC-MHD over OC-MHD was erroneously negated because it overlooked that it would take billions to build a commercially viable OC-MHD power plant, while a 15 MW power plant could have been commercially viable.

Furthermore, by insisting on coal firing which would require direct coal firing to be efficient and economical at 1000 MW, the assumption was made that it would not be competitive. When Cases 102 and 102A were shown to be competitive in Phase 1A, CC-MHD was not allowed to proceed to Phase 2. To show this bias, the Closed Cycle gas turbine which was advocated by GE, and found in Phase 1 to be totally non-competitive with 1500° F. metal tube heat exchangers in an atmospheric fluid bed coal boiler to heat the high pressure helium, was allowed to advance to Phase 2 by using technically questionable silicon carbide tubes to increase the efficiency but also sharply increasing the cost to the point it became the most costly cycle by far in the entire ECAS study.

Another roadblock placed by selecting 1000 MW was a sharp increase in capital cost of the closed cycle MHD. The breakdown was as follows:

TABLE 1

Capital Cost of Atmospheric Combustion Case 102 in ECAS Phase 1A

| | |
|---|---|
| MHD 6 T. magnet: $27.8/KWe | Coal combustors: $20.8/KWe |
| 14 Ceramic Ht. Exch: $50/KWe | DC-AC Inverters: $63 |
| $SO_2$ Scrubbers: $58.2/KWe | Sub-Total Major Components: $220.6 KWe |
| Total Components & Balance of Plant | $564.6 $/KWe |
| Total Cost: (with contingency, escalation & interest over 5 years): | $1110/KWe |

This cost is almost the same as $1015/KWe for Case 102A with 10 Heat Exch. & 47.4% Efficiency It is also the same $1102/KWe for Phase 1 Open Cycle MHD & 48.3% Efficiency.

Despite this new result, ERDA did not allow Closed Cycle into ECAS Phase 2.

The capital cost and efficiency was the door to passage to Phase 2 and to further DOE support. Here the selection of a 1000 MW capacity power plant in ECAS was an underhanded approach to eliminate advanced technologies. One way this was done by the engineering firms on the two teams was to place high contingency costs on the advanced systems, and only after advocates of advanced cycles complained, including this inventor, did NASA reduced the contingency costs to a Nth plant after the end of ECAS. Another underhanded approach that resulted from selection of a very large power plant was the time for erection, which was fixed at 5 to 6 years. This sharply increased the capital cost of Closed Cycle MHD, which at 100 MW could be erected in one year. Also, the 1970s was a time of rampant inflation. All this resulted in 50% of the plant cost being financial costs, not technology costs.

Furthermore, as will be discussed in the next sub-section, since CC-MHD is efficient down to 10s of MW, the combustor, the high temperature ceramic heat changers, the inverters can be reduced, and the $SO_2$ scrubber can be completely eliminated. This could reduce the major components from $220.3/KW by over 50%, to the $100/KW range. This would result in a total capital cost in the $500/KW range, even with $CO_2$ separation and sequestration in 1974 dollars ($1750/KW in 2010 dollars). The 50% MHD plant efficiency would make this plant the lowest cost zero emission power source.

Incidentally, this financial cost is the Achilles heel of current attempts to revive nuclear power. These massive multi 1000 MW behemoths take years to build which results in multi-billion dollar costs. The present invention discloses a method whereby small compact nuclear reactors can be erected after the CC-MHD with fossil fuels is fully commercial.

As for new coal fired power plants, the financial costs in addition to SCR and FGD for $NO_x$ and $SO_2$ is also the weakness in 1000+MW coal power plants because the high cost of these emission controls can only be justified in massive power plants. In fact, two-thirds of all US coal power plants are under 300 MW, and they account for one-third of US coal power. Yet they are being driven to shutdown because the very high cost of SCR and FGD in the $500/KW range is too high to justify their installation. Zauderer's patented low cost $SO_2$ and $NO_x$, mercury, and $CO_2$ emission controls can be economically retrofitted to small coal power plants.

Now since CC-MHD power is efficient at 10 s of MW capacity almost the entire financial cost falls away. Interest rates are very low, plant erection time is under 1 year, and the small first generation plants will be so small in the 10s of MW, that contingency costs would be minimum.

The above information as to the details of the ECAS study that occurred in the 1970s was widely known at the time due to the efforts of ERDA and NASA Lewis to publicize them at the time, and also due to a Utility Advisory Group that was formed to evaluate the results and to advise on the selection of those cycles that would proceed to Phase 2. However, it is highly unlikely that this Group would have advised stopping Closed Cycle MHD from Phase 2, as this MHD technology was not well known. This provides another piece of evidence that Open Cycle MHD advocates were responsible for shutting down Closed Cycle MHD.

Normally, the above discussion on the inventor's past experience with MHD power may be no more than of historical interest, as no significant MHD power R&D has been investigated since the early 1980s. A pulsed MHD power revival took place in the late 1980s, but that application was soon terminated Now totally unexpected, this inventor's insight connecting physical separation of $CO_2$ from $N_2$ under pressure with pressurized combustion for a fossil fuel fired closed cycle MHD power plant provides the strongest evidence of the adverse result that can arise when politics and selfish self interest override and interfere with the progress of science and technology, as happened with closed cycle MHD in the 1970s. This is especially the case with MHD, which offers an immediate, profitable solution to $CO_2$ removal from gas and coal fired power plants.

Features in $CO_2$—$N_2$ Separation in Fossil Fuel Fired CC-MHD Power Plants.

Figure 3:
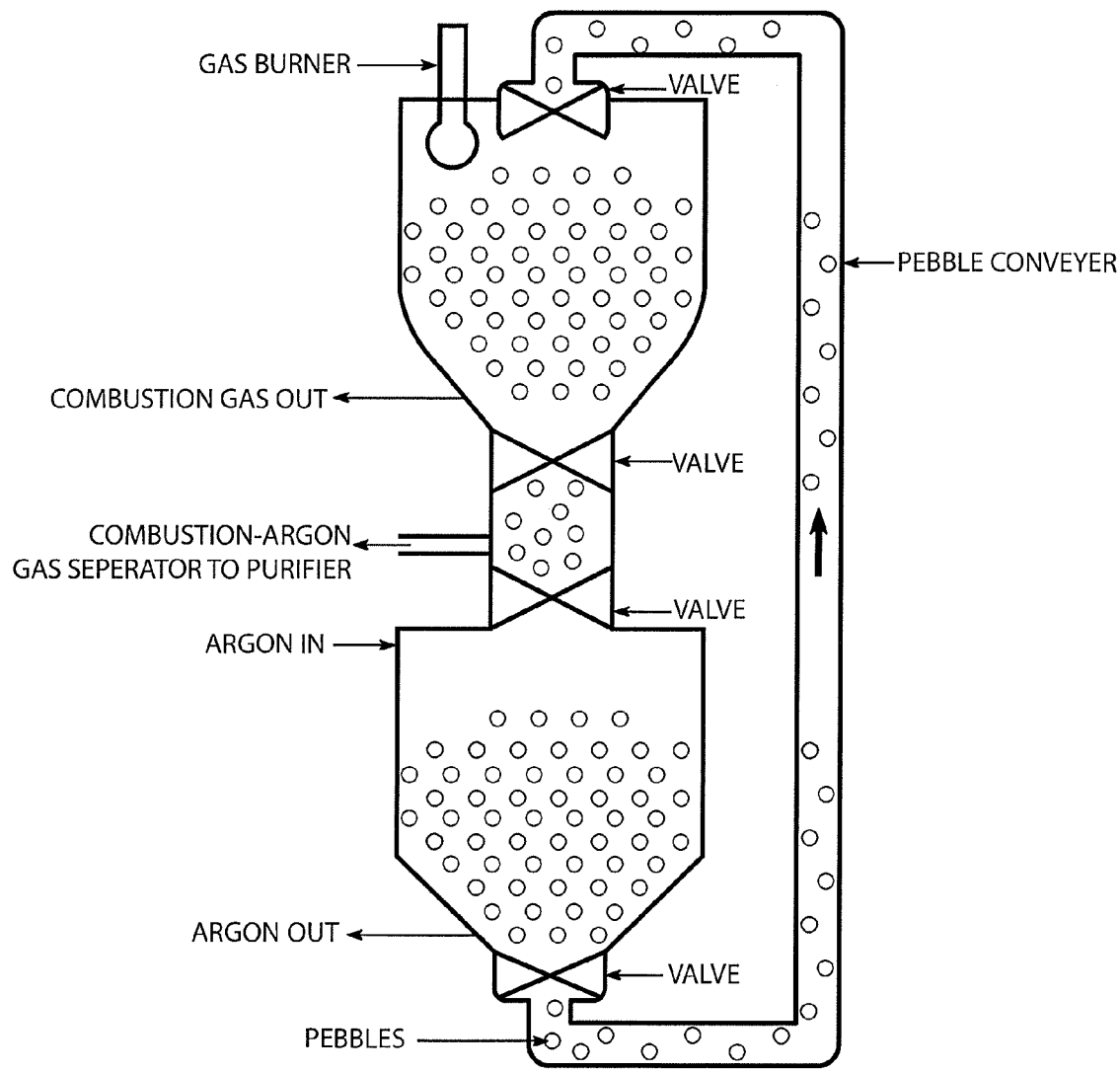
FIG. 3 is a schematic of the falling pebble bed heat exchangers, which are to be used in the fossil fuel heat MHD power plant disclosed herein. A nuclear heat source will use a stationary pebble bed inside the nuclear reactor.

To utilize the fossil fuel fired closed cycle MHD power plant with pressurized $CO_2$ separation, the following changes to the ECAS Case 102A MHD plant must be made:

1) Replace the cored brick with pebble bed heat exchangers shown in FIG. 3. By the mid-1970s, after the oil crisis and TMI nuclear accident the consensus in the energy field was that coal was the fuel of the' future. Closed cycle, noble gas MHD, which over the decade of the 1960s was developed for use with gas cooled, 3000° F. high temperature nuclear reactors, had to shift to direct coal firing or clean gas or liquid coal derived fuels. This was the reason for using regenerative cored brick heat exchangers to transfer heat from the combustion gases to the inert, noble gas, closed cycle MHD gas. The cored brick heat exchangers were developed many decades earlier for air heating for iron blast furnaces. In the early $20^{th}$ Century these units had large diameter (about 4 inches) holes to prevent plugging the gas passage with ash, which in any case required frequent shutdowns to clean out ash deposits. Over the years, as more ash was removed from the combustion gases, the hole size was reduced. For MHD application the hole size was ¼ inch for clean gases, such as propane, natural gas, or low Btu gas. This was verified by tests at GE and at Eindhoven University, Netherlands. For direct coal firing, ¾ to 1-inch sizes were acceptable. But as discussed above, even with small holes sizes, the number and size of the cored brick heat exchangers per power plant were very costly.

The real solution, and the one that is disclosed in the present invention, is to use pebble bed heat exchangers for the following reasons:

One, natural gas is now abundant so there is no reason to use direct coal firing.

Two, heat transfer is almost entirely by convection and the surface area of a spherical pebble is substantially greater than the area of a cylindrical cored brick hole, which means that the pebble bed heat exchangers are very much smaller for equal heat transfer.

Three, Zauderer's U.S. Pat. No. 7,282,189 in which the volatile matter in the coal is converted preferably to hydrogen or to methane, and in either case these are ash free. The char and ash are burned in a parallel air cooled, slagging combustor in steam plants. Zauderer's two Provisional Applications of Jan. 1, 2010 and Sep. 8, 2010 disclosed that conversion of the coal ash into cementitious slag and $CO_2$ capture can yield several times the revenue from electricity alone. There was a parallel closed cycle MHD plant proposed by Zauderer's MHD Group in the ECAS study that was rejected due to its low efficiency. This would have been the opportunity to introduce pebble bed heat exchangers for use with ash free hydrogen or methane. Here is another example of making a short-sighted decision on a new technology with over a decade of successful progress, to stop further development.

The present MHD closed cycle, shown in the present FIG. 4, is thermodynamically somewhat similar to the hydrogen fired gas turbine cycle shown in FIG. 4 in Zauderer's U.S. Pat. No. 7,282,189, except in the present Application the hydrogen fired gas turbine with a steam bottoming cycle (Item 4322 in FIG. 4, in said patent), is replaced with the argon CC-MHD generator. A gas fuel heats the argon gas, and the argon exhaust from the MHD generator heats a steam heat recovery bottoming cycle. If coal char is produced as a by-product from coal in which hydrogen or methane is pyrolized from the coal's volatile matter, the char is fired in a steam power plant, shown in FIG. 4 in the present Invention, which performs the same function as the char fired steam power plant in FIG. 4 in said patent with the combustor (44) steam boiler (441) and steam turbine (442).

Four, and importantly, the development of pebble bed heat exchangers would serve as a data base for future use in gas cooled nuclear reactors, as suggested herein.

Another major improvement in the present invention is to use a specially modified pressurized combustor for the heat exchangers. In the Phase 1 ECAS study all cases were for atmospheres combustion. The Westinghouse team used 2.5 inch diameter square holes, which required 56 cored brick heat exchangers at a cost of $230 per KW thermal. The GE team used for clean, ash free, low BTU coal gas cored brick heat exchangers with ¼ inch diameter cored holes with a cost of $36 per KW thermal. The NASA review team used ¾ inch holes at a cost of $53 per KW thermal. As noted above, in Phase 1A, Cases 102 and 102A with 10% of the coal ash entering the heat exchangers, GE used 1 inch holes with 14 heat exchangers at one atmosphere combustion and 10 heat exchangers at 4 atmospheres combustion at a cost of $50 per KW electric, which would be $110 per KW thermal.

However, as has been made clear in the present Invention, the use of direct coal firing to the heat exchangers with even only 10% ash laden gas is not economically justified. The 4 atm. combustion was selected to balance the combustion to argon heat transfer. Now ¼ inch D. holes at 1 atm. reduces the heat exchangers from 14 to 11. So at 4 atm, the heat exchangers would be reduced to 8, instead of the 10 H.E. for case 102A with 1 inch holes.

Therefore, the present invention discloses the use of spherical pebble bed heat exchangers to be fired with clean fossil fuels of natural gas, or hydrogen or methane derived from volatile matter in coal, or gas derived from complete gasification of coal. To show the major financial benefit of the pebble bed over cored brick, the pebble bed size will be compared with the Case 102A, with its 4 atmosphere cored brick heat exchanger. The latter is shown schematically in FIG. 1 for the atmospheric combustion Case 102.

A detailed calculation requires considerable computer calculations using established heat transfer analysis. However, the objective here is to show the major advantage of pebble bed over cored brick heat exchangers. The pebble bed design is similar to that used in Zauderer's U.S. Pat. No. 7,282,189, FIG. 4, namely, a falling pebble bed heat exchanger similar to that shown as Item 421 in FIG. 4 of said patent. The present concept is shown in FIG. 3 herein. It shows two cylinders on top of each other, each with a conical bottom. The top half is the fossil fuel heat input, with a conical bottom through which the spherical pebbles heated to several 100 degrees F. over 3000° F. drop to the bottom half of the cylinder in which argon is heated to 3000° F. The spheres then drop onto a conveyor that lifts them to the top of the top cylinder and drops them into the pebble-heating cylinder. The gas burners in the top cylinder are located in the top cylinder arranged so that pebbles reach the peak temperature, as they are ready to drop to the bottom cylinder. The combustion gases must be removed before the pebbles drop into the argon heat cylinder because molecular gases quench the non-equilibrium ionization reaction.

Several major differences exist in this pebble heat exchanger from the cored brick units. In the latter the heat transfer process from combustion is sequenced in four steps. As described above for Cases 102 in a 70 minute cycle, one exchanger is evacuated of combustion gases in 5 minutes, four cored exchangers heat argon in 20 min, one is evacuated of combustion gases in minutes, eight are heated for 40 minutes. This is a major disadvantage, as it requires a large number of costly exchangers, a number that is only modestly reduced at 4 atmospheres. In sharp contrast, the moving pebble bed is a continuous heating and cooling process. However, it still requires preventing the combustion gases from entering the argon heater section to a concentration of no more that a few tenths of one percent.

Again using Case 102A as an example, one way to implement removing combustion gases is to increase the combustion pressure to 10 atm., the same as the argon pressure, which will minimize any diffusion of one gas into the other. In addition, any gas mixture formed in the cylinder that separates the top from the bottom sections of the heat exchanger (see FIG. 3) will be bled through one or more openings in this interface in order to process separation of the combustion gases from the argon in the bled gas mixture.

Another option is to insert rotary valves at the top and bottom of said separation cylinder as shown in FIG. 3 herein, and also shown in U.S. Pat. No. 7,282,189 FIG. 4, valve 4218. The cooling design of the present valves will be a greater challenge than in said patent as the pebble temperatures are somewhat above 3000° F., which is double the temperature in said patent. However, it is not impossible because the valve would be coated with a ceramic material sprayed onto the high alloy, such as Inconel 800H. Also, limiting combustion-argon gas mixing is the absence of a pressure difference across the valves. The combustion gases between the upper and lower rotary valves would be evacuated and replaced with argon as the rotary valves rotate in a synchronized manner.

Should the above solutions fail to prevent mixing of the two gases, another option could be the same cycling system as used in the ECAS Case 102A, only the number of heat exchangers would be as little as four, and the pebbles in each of the 4 units would be stationary.

Case 102 is also used herein to demonstrate the major advantage of the pebble bed over the cored brick. A detailed comparison involves considerable analysis with methods used in the ECAS cases. However, there are two numbers of primary interest. They can be obtained by simple calculations. One is the overall average convective film coefficient in the heat exchangers to assure that the overall heat transfer is at a reasonable value. The other is the total volume of the cored brick and pebble bed units, which will show how much cheaper the latter, are over the former. The first step is to use the surface area in Case 102, where each of the 4 heat exchangers is in the argon heating cycle at one time. Each one has a 21 ft. D, 60 ft H core, with 1-inch holes that account for a 35% void fraction. These four accounted for the total heat transfer at 10 atm. pressure to the argon in 20 minute periods of the argon heat up cycle. The total volume of the 4 units is 29,119 cu. ft., which is equal to 87,331 cu. ft. of empty surface volume in contact with the argon flow per hour. Also, each 60 ft. deep one inch D. hole has a surface area of 15.7 sq. ft., which yields a total surface area for all the 1 inch holes in contact with the argon per hour of 348,948 sq. ft. The total heat input to Case 102 was 2000 MW, which equals $6.82 \times 10^9$ Btu/hr, which for simplicity will be assumed to be the average between argon peak and rejection temperatures of 3121° F. and 713° F. Using the standard heat transfer equation the heat-transfer equals the film coefficient, h, times the surface area times the temperature difference. The result is an h of 8.12 Bu/hr/ft$^2$. This is a reasonable value from textbook examples to heat and cool inside tubes.

The next step is to replace the cored brick assembly with a pebble bed filled cylinder of height over diameter ratio of 3, as was done for the cored brick core. Two-inch diameter alumina spheres are used because that is also in the range of sphere in pebble bed nuclear reactors, whose use is also disclosed herein. These 2-inch spheres have a surface area of 0.0872 ft$^2$ and their volume is 0.00242 ft$^3$. They are now used to calculate the dimensions of a single top and bottom pebble bed cylinder and the number of 2-inch spherical pebbles needed to fill them. The number of pebbles that equal to the surface area of the cored brick holes that are in contact with the argon or the combustion gases is 348,948/0.0872=4 million pebbles. Thus these pebbles will occupy $4*10^6 \times 0.00242$=9,680 cu. ft. volume for each top and bottom half of the entire pebble bed heat exchanger core, plus insulation. Unlike the cored bricks whose void fraction was 35%, a void fraction of 45%, cited for some packed beds in the literature, is used, leaving 55% for the pebbles to occupy each half of the of the heat exchanger. This yields a total combined pebble plus void volume of 9680/0.55=17,600 cu. ft. Using the same 3 to 1 height-to-diameter as the cored brick yields a core diameter of $0.786*D^2*3D=2.358*D^3$, resulting in D=(17600/2.358)$^{0.33}$=19.5 ft, and H=58.5 ft. H. for each top heat-in and bottom heat-out core, plus insulation. In other words the combined height of the two halves of this one pebble bed heat exchanger is 117 feet. This is in the range of a 1,000 MWe boiler. To this must be added the cone length at the bottom of each half, which reduces the vertical cylinder height but increases the total height. However, this calculation is only meant to show how to analyze the problem, and how to compare it to ECAS Case 102. The L/D can be changed, the gas pressure can be increased, and the number of units can be increased, all by dividing the heat transfer per unit. But in any case the present pebble bed solution requires only a tiny fraction solids versus those in the cored brick heat exchangers.

Case 102 is used in this Application as the basis for comparing the present pebble bed with the Case 102 cored bricks. With insulation, the diameter of each of the 14 heat exchangers was 24 ft, and the height 85 ft, and the total weight was $3.724*10^6$ lbs per exchanger, for an incredible total of 52.14 million pounds for all 14 exchangers Therefore, even reducing the units from 14 to 10 as was done for the pressurized combustion Case 102A is still a minor reduction in the total weight. Subtracting the insulation, and using the 80% density aluminum oxide that was used in ECAS (200 lb/cu. ft.), and 65% of the volume for the ceramic bricks, yields 2.76 million lbs, or 72.2% of the weight of the eight cored brick heat exchangers, with cycled heating and cooling units (not counting the two purge units) for the pressurized combustion Case 102A. In contrast, using the same heat transfer and unit costs in a single pebble bed heat exchanger, including the top (9,680 cu. ft.) and bottom half (9,680 cu. ft.) of pebbles at 200 lb/cu. ft., yields a total alumina of 3.872 million pounds, (7.4% of Case 102), which would cost $46.5 million× 0.126=$5.86 million, or $6.3/KWe, for the same use as the $50/KWe units in ECAS Case 102.

Furthermore, the combustors would have gas burners mounted inside or attached to the heat exchangers, so that the combustors cost will be only a few percent of the $20.8/KWe stated for the coal fired combustors in ECAS Cases 102.

The $SO_2$ scrubbers that cost $58.2/KWe in Case 102 would not be needed with gas fuel.

In Phase 2 of the ECAS Open Cycle MHD, the Inverter costs were reduced by 50% by rearranging the electrode connection to a slanted configuration that reduced the number of inverters needed. Using the same arrangement would reduce the Inverter cost from $63.5/KWe (See Table 1) to $37.5/KWe in the present case.

Table 1 shows the present major components cost arranged as in Case 102. They are: Magnet $27.8/KWe; Combustor $2.62/KWe, Heat Exchangers $6.3/KWe, Inverters $37.5.KW, Scrubber $0: Sub-Total: $72.22, or 33% of ECAS Case 102.

Assuming the Balance of Plant remains as in Case 102, namely, $344.4/KWe, which is an overestimate in view of the present major Component reduction, the Components and Balance of Plant would be $416.52/KWe, without reduction, and $312/KWe assuming a 25% reduction.

The financial costs, which was $435.4/KWe in Case 102 should be reduced by at least 50% to $200/KWe.

This yields a total cost of $584/KWe for a 1000 MW plant for the present case versus $1,110/KWe for Case 102.

After completing the above cost results on the closed cycle MHD ECAS analysis, this inventor discovered in the documents on the ECAS studies that corroborate his claim that the Closed Cycle MHD plant was unjustly removed from the Phase 2 effort, which led to a cutoff in funding. This information is in the "ECAS SUMMARY" Report prepared by NASA Lewis submitted to ERDA and NSF, dated September 1977, Doc. No.: NASA TM-73671. Specifically:

TABLE 2

ECAS -GE Phase 2 & (*) GE-Phase
1A C.C.MHD Case 102A & (**) Case 102A-Gas

| Power Plant | Power-MW | Efficiency % | Erect years | $/kW w/o Finance/Escalate | $/kW-ECAS |
|---|---|---|---|---|---|
| 1-AFB Steam | 814 | 35.8 | 5.5 | 408 | 632 |
| 6-Low Btu/Gas Turbine/Steam | 585 | 39.6 | 5 | 518 | 771 |
| 5. AFB/C.C. Gas Turb./Organic | 478 | 39.9 | 5 | 829 | 1232 |
| 4. PFB/Potassium/Steam | 996 | 44.4 | 5.5 | 603 | 1232 |
| 10-Coal/O.C. MHD/Steam | 1932 | 48.3 | 6.5 | 429 | 720/1102** |
| *Coal/C.C. MHD/Steam-102A | 949 | 47.4 | 6 | 564 | 1110 |
| ***Gas/C.C. MHD/Steam-102A | 902 | 45.1 | <5 est. | 312 | 584 |

AFB-Atmospheric Fluid Bed Boiler
PFB-Pressurized Fluid Bed Boiler
*Closed Cycle MHD/Steam Phase 1A result, Excluded from Phase 2 by ERDA
**Phase 1 total cost $1102; Phase 2-$720 from new balance of plant & new DC Inverters
***C.C.-MHD/Steam with Natural gas & modified as per discussion on Table 1 above. Also note that this modified CC-MHD power plants includes $CO_2$ removal and sequestration.

The ECAS Combined PFB-Potassium Vapor Topping/Steam Bottoming Cycles—

This cycle is included in Table 2 as another example on the biased actions that permeated the ECAS project. This vapor cycle presumably originated with work on alkali metals for potential use in breeder nuclear reactors which were considered in the early 1970s as the next step in major expansion of nuclear power. This of course came to an abrupt end after the TMI disaster in 1973. The GE February 1976 report on GE's ECAS Phase 1 work summarized the features of this potassium vapor system. The 27 references cited in this report to this potassium system are mostly by GE authors, indicating GE's interest in this technology, which after TMI had no more mission, and latching it on to coal with a pressurized fluid bed boiler to provide the peak 1500° F. temperature, might sustain it. This inventor only noticed this potassium cycle during the preparation of the provisional application of the present document. Therefore, he has no information on how those cycle advocates would deal with the potentially serious consequences of a rupture of the potassium vapor filled pipes in the coal fluid bed boiler, or in the steam-bottoming boiler. However, Table 2 clearly shows that this cycle was less efficient and much more costly than closed cycle MHD, yet it was allowed to proceed to Phase 2. Therefore, there was no reason for GE not to propose moving the CC-MHD to Phase 2. This raises the suspicion that in addition to open cycle MHD advocates, there were others with a motive to stop the far less costly CC-MHD.

At present, these MHD costs are of interest only in the future after Closed Cycle MHD power plants have been shown to be commercially viable at power levels in the 10s of MW. In sharp contrast, Open Cycle MHD power plants are only viable at 1000 MW because their low electrical conductivity is about 20 times lower than for Closed Cycle. It is therefore unlikely that Open Cycle MHD will return.

The ECAS Combined Closed Cycle Gas Turbine Topping/Organic Bottoming Cycles—

Another cycle that was promoted by GE to Phase 2 was the Helium High Pressure Closed Cycle. This was another possible reason for the ECAS selection of 1000 MW capacity, to the detriment of Closed Cycle MHD, and other small power plants. 1000 MW power plants yield billions in revenue to equipment suppliers and installers. This is one reason for including the ECAS closed cycle gas turbine in the present Invention in order to demonstrate the gross bias of the ECAS results. In Phase 1 of this gas turbine closed cycle, high alloy metal tubes were used to heat the helium to 1500° F., which gave efficiencies in the low 30s % range and very high cost. So GE shifted the closed cycle gas turbine tubes to silicon carbide to heat the 1000 psi helium to 1800° F. This material is very expensive and to the best of this Inventors knowledge has not been commercially developed to date. While this improved the over all efficiency to 39.9%, the total capital cost of $829.KW w/o interest and escalation and $1232/KW with the ECAS ground rules of 10% annual interest and 6.5% annual escalation made this one of the highest Phase 2 cost. Despite this major change of the cycle for Phase 2, the ECAS team refused to include the Closed Cycle MHD Case 102 and 102A despite its matching the performance of the best Open Cycle MHD case, and despite the minor change made from Phase 1 to achieve this.

The second reason for including the closed cycle gas turbine is to disclose its possible adaptation to the pebble bed heat exchanger, which could approach 50% thermodynamic cycle efficiency with an organic bottoming cycle. However, the working fluid will have to change to air because there is no reasonable way of preventing the helium from escaping to the combustion gases at the helium-combustion gas interface.

In any case, all these shortcomings of the closed cycle gas turbine were known in the 1970s, yet it was included in Phase 2. Another reason may have been the interest in this cycle for gas cooled nuclear actors, which was implemented in the 1950s at several locations in the US and overseas. Germany developed a gas cooled nuclear power plant, but sold the technology to South Africa in the 1990s. The latter program was closed in 2010 after a decade of development presumably due to its high cost.

Closed Cycle MHD R&D was implemented in worldwide research centers throughout the 1960s and 1970s, including at GE from 1961 in the Space Division under support from the US Navy. The work at GE was ready for demonstration at 50 MW thermal with projected about 15 MW electric output, which would make the technology commercially viable. GE's Corporate R&D and Power Group supported the effort and committed funds, as did the Electric Power Research Institute to initiate the 50 MW project. Despite this, ERDA refused to include CC-MHD in Phase 2 and DOE refused to support the 50 MW project whose estimated cost was about $3 million. This was at a time when through a Congressional Earmark, Open Cycle MHD received $50 million annually and $400 million in the 1970s to 1981, when the new Administration cut off funds. In retrospect this cut off of Closed Cycle was and remains inexcusable because the decade plus research at GE clearly showed that commercial scale power was achievable. After expenditure of $400 million of US Taxpayer funds there was nothing to show for Open Cycle MHD. The present invention in which CC-MHD can achieve total $CO_2$ sequestration at less than a power plant 5% efficiency loss and at minimal cost, which no other $CO_2$ control technology can match, shows how much the USA lost in cutting off the miniscule funding for this technology that still holds huge potential, as disclosed in this invention.

Another proof of the dubious approach toward Closed Cycle MHD was this inventor's chance finding for the first time in October 2010 in a copy of a GE Contract Phase 1 Presentation book for NASA Lewis dated, Jan. 14, 1975, Table 2.6-2. It lists all the "Parametric Variations for the Closed Cycle Inert Gas MHD" that were selected at the beginning of the Phase 1 effort. It lists the MHD Topping System parametric cases and the Parallel MHD/Steam System cases. Under the MHD Topping list, the Base Case was 600 MWe, and the variations were 100 MWe, and 1200 MWe. This Inventor, who led the GE CC-MHD Group recalls advocating a low power nominal 100 MWe case due to the high electric conductivity of closed cycle MHD. Table 2 shows that it is 20 times that of open cycle MHD. This Inventor presented this chart on numerous occasions in the 1970s. Yet there is no record of the results of the 100 MW case in the ECAS report. However, the NASA Lewis Team that monitored the ECAS effort of the GE and Westinghouse teams recommended that the Closed Cycle MHD work should continue as it showed similar performance promise as Open Cycle MHD. ERDA and DOE ignored this recommendation.

From the vantage point of the $21^{st}$ Century, this was a major mistake because the investment would have been a pittance of several million dollars in the 1970s, and had GE persevered they might today be the prime supplier of zero emission gas fired power and nuclear power plants. Furthermore, nuclear closed cycle MHD generators and accelerators can be applied to unmanned and manned space travel, especially now that water and hydrogen have just been discovered on the Moon, which makes the Moon and ideal base for interplanetary space travel.

A 100 MW Pebble Bed-Closed Cycle MHD Plant: To demonstrate the benefits of pebble bed heat exchangers for small power plants, 100 MWe is selected. Assuming again 2-inch diameter spheres would require about 400,000 pebbles. The heat exchanger would occupy 968 cu. ft. Again using a 45% void fraction, results in 55% volume for the pebbles, which yields a total top or bottom cylinder of 1760 cu. ft. With an L/D of 3 results in 9.06 ft. D×27.2 ft. H core heat exchanger for the top combustion unit and the same size for the argon unit, for a total 9.06 ft. D, and 54.4 ft. H. plus the height of the bottom cone on both, plus the insulation.

The height could be reduced with L/D of 2, yielding a 10.4 ft. D and 20.8 ft. H for each half of the pebble bed, and a 41.6 feet total core height plus the bottom cones and insulation. This applies only if all the power that is extracted from the steam bottoming cycle is used to drive the air and argon gas compressors.

Another alternative is to operate at 20 atmospheres, which would further reduce the heat exchanger size but require more compressor power.

Alternatively, if a four cycle heating schedule for the argon by natural gas and including one unit each for flushing out the combustion gas and argon is used in order to reduce molecular gas contamination of the argon, it would only double the size of the heat exchangers with one combustion gas unit, one combustion gas evacuation unit, one argon heating unit, and one argon evacuation unit. In this case, the combustion heat-in and argon heat-out heat exchangers would be separated.

So in conclusion, the selection of a 1000 MW plant size and only coal power was imposed by ERDA in order to remove challenges from power technologies that were backed up by decade long successful R&D, as was the case for Closed Cycle MHD.

$CO_2$ Separation and Sequestration in a Pressurized Combustion Closed Cycle MHD Plant.

This Section concerns a totally unanticipated application for Closed Cycle MHD that could have a very major impact on zero emission fossil fuels with total $CO_2$ sequestration. This Invention could also provide the groundwork and motivation for nuclear MHD power for terrestrial and space use.

In Provisional Application No. 61/380,913, Zauderer disclosed an improved method of separating $CO_2$ from $N_2$ in a two-step process compared to the two step and one-step processes disclosed in Zauderer's U.S. Pat. No. 7,282,189, the contents of which are incorporated by reference in its entirety herein. According to Henry's Law, the solubility of $CO_2$ in water is a function of pressure at a given temperature. At ambient temperature and 14.7 psi, the solubility is extremely low, 1 lb of $CO_2$ per 670 lb of water at about 75° F. The two-step process comprises dissolving $CO_2$ in water at a pressure that does not require an excessive amount of water. To further reduce the water amount, the $CO_2$ concentration in the combustion exhaust must be maximized. Combustion of 100% carbon in coal in air at a stoichiometric ratio of unity, such as found in devolatilized coal char, anthracite, and unburned carbon in ash, yields the highest $CO_2$ in the exhaust, namely 20% by volume, which after combustion in air leaves $N_2$ as the balance. To minimize the $CO_2$ separation and sequestration power, a pressure of 10 atm (147 psi) is selected, where the water over $CO_2$ ratio at ambient temperature is down to 67 to 1. The $N_2$, which is essentially insoluble in water, is removed and expanded in a turbine to recover most of the $N_2$ compression power. In the patented two-step process, the remaining water-$CO_2$ solution is compressed to 1000 psi for sequestration in deep underground limestone formations. This process consumes about 25% of the coal plant's power output.

In the new two-step process disclosed in said September 2010 Provisional, after the $N_2$ is separated from the $CO_2$-water solution, the $CO_2$ is separated as gas bubbles that rapidly float to the top of the solution vessel as the pressure is reduced to atmospheric. The $CO_2$ is then re-compressed to 1000 psi, while the left over water is reused for new $CO_2$ capture. This new two-step process consumes only 12% of the plants power. Both these physical $CO_2$ removal processes are much more efficient and much better than the chemical $CO_2$ separation processes, mostly with amines, followed by underground sequestration. This chemical process consumes 26% of the plant's output, and costs about $73 per ton of $CO_2$ removed and per MW of power produced.

In all current turbines fired with natural gas, the $CO_2$ concentration is mostly in the 3% to 4% range, and even chemical separation is not technically and economically feasible. Advocates of "clean" gas fail to mention that the $CO_2$ emissions from natural gas have nearly ½ ton per MW electric, which is one-half the $CO_2$ from "dirty" coal. In said September 2010 Provisional Application, Zauderer notes that the very low concentration of $CO_2$ is primarily due to high excess air that is needed to cool the gas turbines blades at high gas temperature. To correct this $CO_2$ dilution, Zauderer discloses using an inert gas, such as $CO_2$, or water, to cool the turbine blades. In addition, the turbine should operate at a stoichiometric ratio of unity, and condense the water vapor at the boiler exit. This increases the $CO_2$ concentration to 11% at the gas exit, which is where physical separation of the $CO_2$ is possible but not as efficient as with 20% $CO_2$ from coal.

In the mid-1970s during the ECAS study, the GE Closed Cycle MHD Group proposed, probably by Zauderer, using the compressed combustion gas to indirectly heat the MHD argon gas. This would reduce the number of cored brick, regenerative heat exchangers. $CO_2$ was not an issue at that time. It is only now on revisiting MHD, that it occurred to Zauderer that Case 102A could be used for the $CO_2$ separation disclosed in his recent patent and Inventions. Case 102A was set at 4 atmospheres combustion gas in order to balance the heat transfer between the combustion gas and the 10 atmospheres argon. Since the combustion gases were used solely as a heat transfer medium, the compression energy could be almost totally recovered in a low temperature gas turbine. This results in zero net power from air compression by recovering its energy by expansion of the 3390° F. combustion gas exiting the bottom of the regenerative heat exchangers at about 1180° F. However, by shifting to pebble bed heat exchangers to operating continuously, as opposed to sequential cycling with the cored brick heat exchangers, the combustion pressure can be increased to 10 atmosphere in order balance the pressure between the combustion gas and argon sides and greatly reduce any combustion gas mixing with the argon. This of course eliminates the need for two purge heat exchangers. By coincidence the 10 atmospheres pressure is also used in the first step of the two-step $CO_2$ process in the previous Provisional Application.

$CO_2$ removal from closed cycle gas turbines: The indirect heating closed cycle can also be used to remove $CO_2$ from a fossil fuel, closed gas turbine. At present open cycle gas turbines cannot have $CO_2$ economically removed with chemical separation due to the low $CO_2$ concentration. On the other hand, the indirectly fired closed cycle proposed for MHD can also be applied to closed cycle gas turbines. However, due to gas temperature limitation of about 1500° F. on metal tubes used to heat the gas turbine helium, the overall efficiency will be in the mid-30% range, as reported in ECAS Phase 1. In the ECAS Phase 2 effort, the GE ECAS team changed the heat exchanger tubes from 1500° F. high alloy metals to 1800° F. silicon carbide. This increased the overall efficiency to 39.9%, but this made the cost the most expensive at $1232/KW under ECAS ground rules, which was the costliest cycle, and in any case no such tube material came on the market.

A closed cycle is necessary because the turbine cannot operate at the 3000° F. combustion temperature needed to yield 11% $CO_2$ with SR=1. Lowering the temperature by adding air will dilute $CO_2$, or adding $CO_2$ just increases the energy to remove it, or adding water will lower the efficiency. Also, at the exhaust end, the gas temperature is many hundreds of degrees F., which requires cooling to ambient to increase $CO_2$ solubility.

It may be possible to apply the pebble bed heat exchanger to gas turbines if ceramic dust abrasion on turbine blades can be prevented. To date high gas temperatures closed cycle turbines have not entered the market. Also, the closed cycle gas cannot be at 1000 psi helium because it would leak out to the combustion side in the pebble bed heat exchanger. Air could be satisfactory as was the Escher-Wyss closed cycle. Also, the pressure would be in the 150 psi to 300 psi range which reduces the efficiency. This closed cycle gas turbine might be of interest if the price of $CO_2$ emissions were high. In that case the MHD cycle would be even more attractive.

Separation of $CO_2$ from Pressurized Methane Combustion in Closed Cycle MHD

The present invention discloses how the $CO_2$—$N_2$ separation process described in Zauderer's U.S. Pat. No. 7,282,189 and Provisional Application No. 61/380,913 is applied to the pressurized gaseous combustion products from a gaseous fossil fuel, such as methane, in a regenerative heat exchanger in a closed cycle MHD power plant. By way of example, the application is described for the 1000 MW (electric), nominal 2000 MW (thermal) MHD plant whose combustion system is totally modified from the coal fired, cored brick cycled regenerative heat exchangers used in the ECAS study to a methane gas fired pebble bed regenerative heat exchanger. The specific example selected is the pressurized combustion Case 102A from the ECAS study. The fuel ground rule for said ECAS study was coal firing, whose deficiencies are discussed in the previous sections. All the MHD generation power aspects of Case 102A plant are assumed to remain the same as before, as they do not directly impact the $CO_2$ process. This Section shows how the $CO_2$ separation is implemented and how it impacts the power plant's efficiency.

Application of the $CO_2$ separation and sequestration process to the Case 102A plant would reduce the 47.4% overall efficiency of this MHD power plant by an almost negligible 4.9%, to 45% net. There is no other $CO_2$ sequestration process that even approaches this performance. Zauderer's two step $CO_2$ process reduces the efficiency by 12% for coal plants, and the chemical separation on which DOE and industry are investing about $5 billion, reduce the efficiency by as much as 26%. The following provides the details:

The Case 102A example is supplied with 305,000 lb/hr of methane, $CH_4$, which provides 6.83 billion Btu/hour or 2000 MWt.

To maximize the $CO_2$ concentration, the stoichiometric ratio, SR, is assumed at 1.

SR=1 requires $O_2$=1,218,385 lb/hr and $N_2$=4,008,485 lb/hr. The compression to 10 atm. requires 226 MW in one stage for 80% axial flow compressor efficiency, and 181 MW in 3-stage compression with intercooling, which is the preferred step.

The combustion gas is $CO_2$=837,639 lb/hr, $N_2$=4,008,485 lb/hr, and $H_2O$=685,341 lb/hr.

The Case 102A design produced a peak gas temperature of 3390° F. and a heat exchanger exit temperature of 1180° F. The argon is heated to 3000° F., and exits at 850° F.

The following are two critical changes from the ECAS pressurized combustion Closed Cycle MHD Case 102A. The first change is from 4 atmospheres to 10 atm. combustion in order balance the 10 atm. argon because it is essential to eliminate as much as possible mixing of combustion gases with the argon across the combustion-argon boundary.

The second change is even more important. In Case 102A, the energy of the combustion gases now at 10 atm. and 1180°

F. at the heat exchangers exit passed through gas turbines to recover the compression energy. By calculating the expansion of the $CO_2$, $N_2$, and $H_2O$ gases separately results in 303 MW at 90% turbine efficiency. This is more than the 226 MW single stage compression power, and 181 MW with 3 stage compression with intercooling, However, this expansion benefit is not available when $CO_2$ separation is required because dissolving $CO_2$ in water requires a gas and water temperatures of under 100° F., not the 1180° F. at exchanger exit.

To solve this problem it is disclosed that the both $CO_2$ removal and power expansion are possible by first cooling the exhaust of $N_2$, $CO_2$, and $H_2O$ from 1180° F. in a metal heat exchanger to under 100° F. This will condense the $H_2O$ vapor, and dissolve the 837,639 lb/hr of $CO_2$ in 56,121,843 lb/hr of water, i.e. a 61/1, $H_2O/CO_2$ ratio. This yields 112,154 gpm, which is a large number. However, this is a large 1000 MWe power plant. Furthermore, this process continuously re-circulates all the water so that the net water consumption is minimal.

At under 100° F., the $N_2$ is removed as a gas from the dissolved $CO_2$-water solution. This entire process is described in detail in Zauderer's Provisional 61/380,913, which by reference is incorporated herein in its entirety.

Now the cooling of the three gases from 1180° F. to 100° F. releases 468 MW thermal, which is 23% of the 2000 MW thermal input to the power plant. Now if the $N_2$ is reheated to 900° F., still at a nominal 10 atm., its re-expansion through a turbine could yield 171 MW, which is almost the same as the 181 MW consumed in 3 stage compression of the combustion air from 1 to 10 atm. So the pressurized combustion has no net energy consumption, as in Case 102A, but now with a detour to remove the $CO_2$.

Also as explained in said provisional, the $CO_2$ is removed as a gas from the $CO_2$-water solution, and the $CO_2$ is compressed in 3 stages to 1000 psi as required for sequestration underground, preferably as carbonic acid by mixing with small amounts of water, and said acid will dissolve calcium dioxide, i.e. limestone, to form liquid calcium carbonate solutions in underground limestone formations.

The only "new" power consumption is to compress the water to 10 atm to dissolve the $CO_2$. This consumes 9.22 MW per hour with pumps at 70% efficiency.

The $CO_2$ removed from the water by expansion from the 10 atm. solution to 1 atm., must be re-compressed to 1000 psi for underground sequestration. This consumes 36.77 MW per hour.

The combined 36.77 plus 9.22. MW equals 46 MW, which equals 4.85% of the 948 MW output for the ECAS Case 102A for total $CO_2$ sequestration in this MHD plant.

The result is a very efficient power plant with real zero emissions, and a technology that can be directly converted to pebble bed nuclear rectors. But that is not the only gaseous fossil fuel $CO_2$ sequestration MHD cycle, as explained next.

The Parallel Coal Fired Closed Cycle MHD Plant with $CO_2$ Sequestration

In the ECAS Closed Cycle MHD Phase 1 effort, two cycles were investigated. They were cited in GE Contract Presentation book for NASA Lewis dated Jan. 14, 1975, Table 2.6-2, namely, the MHD Topping System and the Parallel MHD/Steam System.

The latter consisted of a regenerative Brayton MHD cycle, similar to the MHD Topping cycle, except in the Parallel cycle, the exhaust from the MHD generator passed through regenerative heat exchangers, while in the Topping cycle, the exhaust combustion gases from the primary ceramic heat exchangers passed to a steam bottoming plant. The parallel cycle selected for the CC-MHD Phase 1 was a coal fired steam power plant. Since the latter is less efficient than the high temperature MHD cycle, the average efficiency of the two cycles in parallel is lower than a topping cycle. Consequently, the NASA evaluation team and all their advisors and the GE project leaders dismissed the parallel cycle as unattractive due to its lower efficiency. However, the focus on efficiency and even capital cost was grossly misplaced because it overlooked much more important considerations. For example:

Open cycle MHD was the most efficient of all cycles, its capital costs were not excessive, and it could inherently control $SO_2$. However, it required a huge 1000 MW plant to achieve its high efficiency of 48%. Therefore, even its Phase 2, $720/KW capital cost (1975 $) (which was one-third less than its Phase 1 of $1100) required an outlay of $720 million, ($2.5 billion in 2010). In contrast, Closed Cycle MHD had the same efficiency (44.4%) not only at 1000 MWe but also at 100 MWe. Therefore, while the ECAS Phase 1A cost was $1110/KW, a commercial 100 MWe plant required only $111 million (1975$). Furthermore, the OC-MHD cost in Phase 2 was reduced to $720/KW from $1102/KW in Phase 1, after major changes in the plant's design. The CC-MHD changes disclosed herein and the use of natural gas, reduces the cost to $584/KW, and by the ECAS ground rules, a 100 MWe CC-MHD plant costs only $58.4 million (1975$), which is only 8% of the cost efficient 1000 MWe Open Cycle MHD plant.

OC-MHD advocates could argue that is with natural gas, not coal. Well, the present invention teaches that the so-called "inefficient parallel-MHD Cycle" can deliver almost the same performance with coal as with natural gas, and at less cost. The present solution is a variation Zauderer's $CO_2$ Sequestration U.S. Pat. No. 7,282,189. Although not called "parallel", its power plant is a "parallel cycle power plant" that doubles the output of the power plant by converting the volatile matter in coal into hydrogen and using it to power a gas turbine-steam turbine combined cycle power plant. The remaining char, comprising carbon and ash, power an existing or new coal fired steam power plant, and separating the total $CO_2$ and sequestering it in underground limestone formations.

The lesson from the ECAS study is that just looking at the overall cost of a new plant is too narrow an analysis of the cost of generating electricity in a power plant. At this time 10,000s of coal power plants MW are being shutdown because they cannot economically meet emission standards, especially $CO_2$ Yet if one were to double the output of the plant under conditions that the added power does not increase the $CO_2$ emissions, the combined $CO_2$ output of the "parallel" plants would equal that of a so-called "clean" natural gas power plant. What if $CO_2$ of the existing plant were also removed, as well as the other pollutants by retrofitting the existing power plant with special air-cooled slagging combustors, then suddenly the "dirty" coal power plant is cleaner than the "clean" natural gas plant. It would also equal the emissions of the "clean renewable wind and solar" but without enormous and perpetual government subsidies paid by taxpayers and electric power consumers to utilities and "investors" who profit from wind and solar power.

This alternative "clean coal" power plant is the subject of the presently disclosed invention in which a coal fired parallel cycle plant can produce electricity that is far less costly than any current commercial full-scale power plant. By way of example and comparison with Zauderer's prior cited inventions, the same Pennsylvania coal is used as in U.S. Pat. No. 7,282,189. To show how the present "parallel cycle" fired with coal would function, the same capacity parallel cycle as was used in said patent will be used. Unless specifically stated, the description of components and sub-systems are identical to those described in said patent. However, the invention can be implemented in any size coal plant, whether new or used.

The same nominal 100 MW existing coal power plant is retrofitted with air-cooled slagging coal that are fired with devolatilized coal char, comprising 100% carbon, ash, and trace elements and compounds. However, there is a significant addition to said patent where the volatile coal is pyrolized to methane and other volatile mostly carbon based gases are used as a fuel or converted to hydrogen for use in a gas turbine topping-steam turbine bottoming cycle. The objective of that patent was to achieve zero emissions from the coal, including the separation of the $CO_2$ from $N_2$ and sequestration of the $CO_2$ in underground geologic formations. Provisional Application No. 61/380,913 teaches further means whereby the $CO_2$ separation and sequestration process may be implemented. Furthermore, Zauderer's Provisional Application No. 61/293,841, dated Jan. 11, 2010 discloses how the ash in coal can be converted to high value cementitious slag, to which the electricity sale and potential credit sales from removal of $CO_2$ can increase the revenue stream to 250% of the wholesale price of electricity alone.

All the above methods and application are still valid. However, the present application, adds among other matters, the use of a closed cycle MHD generator in place of a gas turbine. Also, the use of hydrogen for electricity production would probably generate less revenue than its sale as a transportation fuel for land, sea, air, and space use, or a feedstock for hydrocarbon fuel production, or chemicals production. Therefore, the present invention teaches the use of the volatile matter released from coal pyrolysis be utilized to indirectly heat a Closed Cycle MHD electric generator plant. Also, instead of using the rejected heat from the MHD cycle to power a steam turbine-electric generator bottoming plant, it should preferably be used for steam turbine driven-noble gas, such as argon compression for the MHD Brayton cycle. The advantage of this approach as opposed to operating the closed MHD cycle as a regenerative Brayton cycle with lower temperature heat exchanger than the primary high temperature heat exchangers, is that steam turbine driven compressors will facilitate cooling the argon and combustion gases to near ambient conditions. This will facilitate dissolving the $CO_2$ in water and separate it from $N_2$ in the exhaust, as described in Provisional No. 61/380,913.

To quantify the example, as per said patent's FIG. 4 and Table 1, (U.S. Pat. No. 7,282,189) the same 76,434 lb/hr of fixed carbon in the char, which is 58.3% of 131,105 lb/hr PA coal, is fired in the air-cooled slagging combustors retrofitted to an existing or new steam boiler. Said patent included steam for $H_2$ production, which is not the case here. So using the HHV of char of 14,100 Btu/lb, and a 10,000 Btu/kW Heat Rate, yields 108 MW/hr from the coal char fired boiler. The $CO_2$ emitted from this carbon char is 280,258 lb/hr, (140 t/hr) at the boiler exhaust, state point (n) in Table 1, also number 4511 in FIG. 4 of said patent. This results in a high $CO_2$ emission of 1.3 tons/MWe. However, this is no deficiency because the high 20% by volume of $CO_2$ in the exhaust can be removed by physical separation and sequestered.

But now things change very dramatically from said patent. The pyrolized PA coal volatile matter, which is 39,332 lb/hr (30%) of the above total PA coal. It is assumed that all the $H_2$ of 4.9% in the total PA coal is in the VM, and equals 6,424 lb/hr of $H_2$. For convenience, it is assumed that all the $H_2$ is changed to 25,697 lb/hr of methane, $CH_4$. The rest of the VM has 4716 lb/hr of carbon, and 1704 lb/hr of sulfur. (This is an assumption because some inorganic sulfur is in the char. However, it can be trapped in the slag.). So the $CH_4$ has a HHV of 22,410 Btu/lb that equals 576 MMBtu/hr, plus 66.5 MMBtu/hr from the carbon into $CO_2$, and 6.8 MMBtu/hr from the sulfur into $SO_2$. Therefore, the sum of the total VM combustion is 649 MMBtu/hr (190.2 MW thermal) from the Volatile Matter. This number differs from said patent.

Now the volatile components are fired in the same pebble bed heat exchanger design as described in MHD topping cycle in the above sections of this invention. Note that the above MHD cycle is also not a standard electric power topping cycle because almost all the steam power produced in the bottom cycle is used for gas compression, and all the electricity is produced by the MHD generator, as was done in ECAS Cases 102 and 102A. As a result one can use the 47% overall power plant efficiency over this entire power output range, as was obtained in the 1000 MW ECAS cases, because the non-equilibrium electrical conductivity is the same at 100 MW as 1000 MW, and the electrode voltage losses are about the same by using electrode designs developed and described in the Closed Cycle MHD literature.

As a result, the MHD generator system produces 190.2 MW(thermal)×0.47=89.4 MW/hr. In addition to this very high efficiency, the $CO_2$ is 89,960 lb/ht (44 tons/hr) from volatile carbon) or 0.49 tons/MWe. This is about the same as from "clean" natural gas, only the source is "dirty" coal.

The combined power output is 89.4+108=197.4 MW, which is about the same as in said patent. The total $CO_2$ is 140+44=184 ton=0.93 tons/MW.

Said patent includes $H_2$ production, which requires limestone and char for heat, yielding $CO_2$ of 143,423 lb/hr (FIG. 4 and Table 1, State point 1) plus $CO_2$ of 280,258 lb/hr (FIG. 4 and State point n), for a total $CO_2$ of 423,681 lb/hr (211.8 tons/hr). The net power out is about 200 MW, and 1.06 ton/MW to be sequestered. This is about the same as in the present invention.

On the surface both the patented and present invention yield about the same $CO_2$ ton per MW output, which are to be sequestered. However, the very substantial difference in the efficiency of $CO_2$ removal, as well as the new applications offered by the present invention, such as future nuclear power, propulsion, and method of sequestration.

One major difference is that the MHD part of the power plant has only a nominal 5% power used for sequestration because the combustion gas compression is shared with the MHD heat input cycle. Also, the char heated steam plant reduces the efficiency by about 12%, which is still about less than one-half of chemical sequestration Therefore, the combined efficiency loss for $CO_2$ removal is under 10%.

Zauderer's patent, non-provisional, and provisional applications disclose different methods of physical separation of $CO_2$. The bottom line is that combining these methods may reduce the power needed to effect $CO_2$ separation and sequestration. The MHD cycle disclosed herein with its 5% or less power efficiency loss may very well be the most efficient $CO_2$ separation. The decision on which one to use depends in part on site-specific factors, such as the presence of underground limestone formation, or depleted oil or gas wells, and others are disclosed in said Zauderer documents.

Concerning the present invention, the need to remove the $CO_2$ from the MHD part of the cycle may not be warranted in the first generation MHD power plants due to the small amounts involved. If the $CO_2$ from the parallel steam plant is sequestered, one is left with 44 tons per hour of $CO_2$ from the parallel MHD plant. That works out to 44/200=0.22 tons of $CO_2$ per MW. This is about one-half of the $CO_2$ emitted in "clean" natural has power plants. It is also less than two-thirds, i.e. 63% of the $CO_2$ emission by wind power, which according to the US Energy Information Administration (EIA) blows 25% of the year, with the balance provided by natural gas to minimize $CO_2$, which now operate 24% of the time due to high natural gas prices, but there is gas turbine sufficient capacity to run all year. Now wind plants cost about $1800/KW if made in the US and $1600/KW if made in China. In view of wind capacity limited to 25% of the time, the actual cost of wind is 4 times $1600, and that is with major US and State subsidies. It is no wonder that the private sector is rushing into wind and solar power. In sharp contract, the MHD plant combined with a retrofitted existing coal plant would be available all year round. It would offer either 100% $CO_2$ emission reduction from the steam plant only, or 100% $CO_2$ removal from the both the steam and MHD plants.

To retrofit a 100 MW boiler with slagging combustors, each rated at a nominal 100 MMBtu/hr combustor, would require about 10 combustors. Depending on the age and condition of the boiler, the most important task would be to close all the air leaks in the boiler and exit ducting in order to maintain SR=1 and enable achieving 20% $CO_2$ concentration and efficient physical separation of $CO_2$ followed by sequestration in geologic formations, especially limestone formations. Also, the slagging combustor is needed to implement, at low cost, Zauderer's various emission control processes for $NO_X$, $SO_2$ inside the slagging combustor and the post combustion zone, trapping ash trace metals in slag, including mercury, arsenic, lead, and converting the slag into high value cementitious slag. The cost and time to implement all these refurbishment would be modest and rapidly implemented. The implications of this is that the 10,000s of MW coal fired power plant capacity that have been and are planned to be shut down should be reconsidered as these old plants, almost all of them would be under 300 MWe capacity, represent one-third all US coal power plants, would became profitable, especially as their output would double with either said Zauderer patent or the present disclosure.

As for the parallel closed cycle MHD plant, its design would be the same as described in the previous section for the Topping cycle, with either natural gas or preferably pyrolysis gas from the coal's volatile matter. $CO_2$ removal would be optional for the MHD power plant depending on the site-specific issues and $CO_2$ removal regulations. In any case, the $CO_2$ emissions would be less than any combination of renewable power, such as wind and solar and natural gas.

There are several important lessons cited above that led to this entire invention, including this "parallel" cycle MHD plant.

An important lesson is the erroneous assumption that one can predict future science and technology, and compounding this error by using it to stop R&D in parallel technical fields, and worst of all if the reason for stopping is due to the potential loss of huge Government Earmarked funds in a parallel field. This was the case in the 1970s in the Closed Cycle MHD power program where despite over one decade of extensive R&D data that took the technology to the commercial size demonstration phase, the R&D was stopped so as not to threaten the massive Open Cycle Earmarked funding.

The present analysis of the new "parallel MHD cycle" adds a new unexpected argument showing the adverse consequences of cutting off R&D that is making progress toward its long-term objective. At the time in the 1970s everyone, including this inventor, accepted the conclusion that the parallel MHD cycle comprising a conventional steam power plant next to a MHD plant was inefficient and should not be pursued. This inventor maintained this position at the beginning of work on this invention, and he only included it for completeness.

However, overlooked by everyone in the 1970s and to this date was that $CO_2$ removal favors a parallel cycle, as disclosed in U.S. Pat. No. 7,282,189 for a parallel $H_2$ cycle, and the parallel MHD cycle. This application is much more advantageous when a huge supply of coal-fired power plants with sunk costs paid for is available for scrap value because they cannot economically meet emission standards. To repeat, the steam plant can be retrofitted with slagging combustors to maximize the $CO_2$ in the exhaust, which facilitates $CO_2$ sequestration. As noted above a conventional gas turbine either in parallel or on top of the steam plant is unsuitable for $CO_2$ removal because the atmospheric pressure exhaust prevents technical and economic physical $CO_2$ separation.

The pressurized combustion-Closed Cycle MHD plant in parallel to an existing or new steam plant can separate $CO_2$, as disclosed herein.

Also disclosed herein, the MHD generator can be replaced with a closed cycle gas turbine, although at much lower efficiency and much higher cost, due to the limited nominal 1500° F. peak metal primary heat exchanger temperature. However, the closed cycle gas turbine may be suitable if ceramic dust erosion on turbine blades from the pebble bed heat exchanger can be controlled.

To repeat, the overall lesson from Closed Cycle MHD is that stopping R&D in a technology that is moving forward in solving its technical problems is totally counterproductive especially when the decision is based on non-technical reasons. A contemporary proof of this error is the current energy policy that is almost totally focused on "renewable" energy that by itself cannot solve the entire energy problem, but it is being used to obstruct or stop other existing energy technologies, such as those based on coal or nuclear that in the future might offer total solutions. Furthermore, this same short-sighted focus on "renewables" is being justified by non-technical economic reasons, such creating jobs by Congressional earmarks for construction project that will end, while products from new technologies can create long-term jobs.

Finally, there is only one atmosphere on Earth, and other Nations that cannot afford exorbitant costs for "clean renewable energy" or even gas or oil, have and will continue to rely on coal, and said exhaust, including all the pollutants emitted will drift over the Oceans and deposit on the USA.

While the present invention has been described with respect to specific embodiments, it may be embodied in other specific forms without departing from its spirit or essential attributes. Accordingly, reference should be made to the appended claims, rather than the foregoing specifications and accompanying drawings for an indication of the scope of the invention.

I claim:

1. A process for $CO_2$ removal from combustion products of gas fossil fuels from a Closed Cycle Magnetohydrodynamic (MHD) power plant, comprising:

heating a noble gas, argon or helium, from about 100° F. to about 3000° F. by downward moving pebbles that fill a bottom half of a vertical heat exchanger and heated in a top half, from ambient temperatures to about 3300° F. by gas burners in a ceiling of the top half that operates at nominal 10 to 20 atmosphere pressure and stoichiometric ratio of unity;

after which said pebbles exit from a conical bottom of the top half through a revolving plate valve into a smaller diameter vertical cylinder where the combustion products are evacuated;

after which said pebbles exit through a lower revolving plate valve into the bottom half of the heat exchanger to heat the noble gas to 3000° F.; and when said pebbles reach the bottom of the bottom half and are cooled to a 1000° F. range they pass through a rotating flat plate valve, and fall onto a conveyor belt that delivers them to a top of the top half of the heat exchanger to be reheated by the combustion gases, and the heating-cooling cycle is repeated.

2. The method of claim 1, wherein the pressurized combustion gas serves a dual function as a heat source for the MHD generator power cycle in a regenerative pebble bed heat exchanger and for physical separation of the $CO_2$ from the combustion products at about a same pressure and at ambient gas temperatures in an exhaust of the heat exchanger.

3. The method of claim 1, wherein said combustion gases comprise $CO_2$ and $N_2$, and $H_2O$, at gas temperatures of about 1000° F. inside the cylinder between the top half and lower rotating valves, enter a shell and tube heat exchanger where they are cooled to below 100° F. at about a same gas pressure as in the pebble bed heat exchanger, and the gas mixture then enters a vessel into which water is injected into a gas stream to condense combustion water vapor and to dissolve all the $CO_2$ in the water;

from said water vapor condensing vessel insoluble $N_2$ is extracted and enters another side of said shell and tube gas heat exchanger to be reheated to about 900° F. again at 10 to 20 atmosphere pressure, and the $N_2$ then exits from said shell and tube heat exchanger and enters and expands through a gas turbine to recover an original $N_2$ compression power.

4. The method of claim 3, wherein the dissolved $CO_2$-water solution exiting the water cooling vessel, enters another vessel where the pressure is gradually lowered to 1 atmosphere as the $CO_2$ gas evolves from the $CO_2$-water solution inside a gas turbine where the $CO_2$ recovers most of its original 10 to 20 atmospheres compression energy during the $CO_2$ expansion to 1 atmosphere;

the water used to dissolve the $CO_2$ is removed and reused for subsequent $CO_2$ separation from the combustion gases in order to repeat $CO_2$ removal from the combustion cycle, while the $CO_2$ is compressed from 1 atmosphere to about 1000 psi in single or multi stage compressors, followed by mixing it at high pressure with water to form carbonic acid, and at said high pressure, the $CO_2$-water mixture is injected several 1000 feet underground into geologic limestone formations to form liquid calcium carbonate that permanently sequesters the $CO_2$.

5. The method of claim 1, wherein the heated noble gas exiting the pebble bed heat exchanger is seeded with an alkali metal, including cesium at less than 1% concentration after which the argon-cesium mixture expands through a linear, segmented electrode, Faraday MHD generator where the non-equilibrium electron temperatures increase cesium ionization and its electrical conductivity to about 100 mhos per meter in order to convert 30% to 40% of the argon stagnation enthalpy to direct current electricity at 30 to 40 MW per cubic meter inside the Faraday generator.

6. The method of claim 1, wherein a particulate free, gas fossil fuel that is used in the pebbled bed heat exchanger also provides data needed to develop a database for thermal performance of gas cooled, pebble bed, nuclear reactors used in MHD generator power plants.

7. The method of claim 1, wherein the rotating valves in the top and bottom of the cylinder that is located between the upper and lower half of said pebble bed heat exchanger are dispensed with and the mixing of the combustion gases with the noble gas is limited by maintaining the pressure of the combustion gas in the top half of the pebble bed heat exchanger at approximately equal to the pressure of the noble gas in the bottom half of the heat exchanger and the gas mixture in an interface cylinder is drawn into a separate chamber where the combustion gases are separated from the noble gas, and after said separation, the noble gas is re-injected into the top of the bottom half heat exchanger and the separated combustion gas is mixed with gas leaving the bottom of the top half heat exchanger, all of which prevents molecular contamination of the noble gas without the need for said rotating separation valves.

8. The method of claim 7, wherein in case molecular gas contamination after processing remains in excess of a few tenths of 1% in the noble gas, even with the two rotating valves on top and bottom of a pebble bed separation cylinder, then up to four stationary pebbles bed heat exchangers are used, with one for heating with combustion gases, one for evacuating the combustion gases, one for heating the noble gas and one for evacuating the noble gas, and where the heating and cooling heat exchangers maintain steady heating and cooling in the cycle.

9. The method of claim 1, wherein spherical pebbles are selected at a nominal two inch diameter with a 55% volume packing factor and 45% void volume, and the pebble diameter and packing factor will be selected from heat transfer analysis for specific applications that consider, gas and particle temperatures, particle diameter and packing factor, and pebble material properties.

10. The method of claim 3, wherein when processing the $CO_2$ for separation and sequestration, eliminating a separate compression step for $CO_2$ separation, which reduces the total $CO_2$ sequestration power to less than 5% of total thermal input to the Closed Cycle MHD power plant.

11. The method of claim 1, wherein said entire power plant with $CO_2$ sequestration is economically competitive over power ranges from tens of MW to thousands of MW.

12. The method of claim 1, wherein the noble gas exiting the MHD generator enters a steam boiler whose steam output is utilized to drive the noble gas compressors and any excess steam power above that needed to drive the combustion air compressor is used to generates electricity.

13. The method of claim 1, wherein the noble gas and combustion gases are separately cooled to ambient temperatures to facilitate $CO_2$ separation from the combustion gases at ambient gas temperatures and pressures, followed by its sequestration.

14. The method of claim 1, wherein a closed cycle gas turbine replaces the closed cycle MHD generator, and the gas turbine working fluid is air or $CO_2$, or $N_2$, that is heated either by a shell and tube heat exchanger to about 1500° F., or heated in a falling pebble bed heat exchanger in accordance with claim 1 to a maximum gas temperature at which the gas turbine's cooled turbine blades operate, while maintaining a stoichiometric ratio of unity in the heat input side of the pebble bed heat exchanger in order to enable efficient physical $CO_2$ separation by maintaining a nominal 10 to 20 atmosphere peak pressure in a combustion side, while a peak on the turbine side can be greater than this pressure as long as it is not cooled by $CO_2$.

15. The method of claim 3, wherein the combustion gases, $CO_2$, $N_2$, and $H_2O$ exiting from the pebble bed heat exchanger at a nominal 1180° F. are processed further by cooling to 100° F. in a shell and tube heat exchanger in order to separate the $CO_2$ from the $N_2$ and $H_2O$ after which the $N_2$ is reheated on the other side of said shell and tube heat exchanger to 900° F., at the original nominal 10 atm. followed by expansion of the $N_2$ through a turbine, which results in about 171 MW output, which is almost the same as a 181 MW consumed in 3 stage compression of the combustion air from 1 to 10 atm. with results that the pressurized combustion air has no net energy consumption.

16. The method of claim 14, wherein after the $CO_2$ that is removed as a gas from the $CO_2$-water solution it is compressed in 3 stages to 1000 psi in order to enable $CO_2$ sequestration, as carbonic acid by mixing $CO_2$ with sufficient water, to form liquid carbonic acid thereby facilitating formation of calcium carbonate in underground limestone formations.

17. The method of claim 16, wherein the only additional power consumption required for sequestration is to compress the water to 10 atmosphere in order to dissolve the $CO_2$, which has been removed from the 10 atmosphere $CO_2$-water solution by expansion to 1 atm. followed by re-compression of the $CO_2$ to 1000 psi for underground sequestration.

18. A parallel power cycle in which particulate free, volatile matter that is devolatilized from coal at about 1500° F. and a nominal pressure of 10 to 20 atmospheres, is used to heat a falling pebble bed ceramic heat exchanger that then indirectly heats a closed cycle MHD generator noble gas, and pressurized $CO_2$ in combustion gas that exhausts from the pebble bed heat exchanger is separated and sequestered in accordance with claim 4, and solid coal char remaining in the devolatilized coal is burned in slagging combustors that are retrofitted to existing coal power plant boilers or new coal fired power plant boilers and said $CO_2$ is sequestered separately from the sequestration process in the parallel MHD cycle.

19. The method of claim 18, wherein a coal utilization rate is selected to leave sufficient coal char to fire a coal power plant in which case the MHD plant that is powered by the coal volatile matter will approximately double power output of the char retrofitted coal power plant.

20. The method of claim 18, wherein only the $CO_2$ from the coal char fired steam plant is sequestered.

21. The method of claim 18, wherein the MHD part of the parallel power plant is fired with natural gas, while coal or coal char or coal mine waste fires a steam power plant.

22. The method of claim 18, wherein the coal volatiles remain as is or are converted to methane and other carbon content gas volatiles to fire the closed cycle MHD heat exchanger, and some or all volatiles are only converted to hydrogen to be used as chemical feedstock or hydrogen transportation instead of a gas turbine power fuel.

23. The method of claim 14, wherein the gas turbine blades are cooled by $CO_2$, the $CO_2$ concentration at the turbine exhaust would increase and require more power to separate and sequester the $CO_2$, or if the gas turbine blades are cooled with water or steam, it would require condensation and removal at the turbine exhaust prior to $CO_2$ sequestration.

24. The method of claim 18, wherein when existing fossil fuel power plants are used in the solid fuel parallel cycle, all air infiltration openings into the boiler of the existing coal power plant boilers or new coal fired power plant boilers must be sealed permanently to enable $CO_2$ removal.

25. The method of claim 18, further comprising removing all coal based air, water, and solid pollutants prior to sequestration of the $CO_2$.

* * * * *